US012755040B1

(12) United States Patent
Gardner et al.

(10) Patent No.: US 12,755,040 B1
(45) Date of Patent: Oct. 6, 2026

(54) APPARATUS AND METHODS FOR DEPLOYMENT OF DATASETS

(71) Applicant: 8x8, Inc., Campbell, CA (US)

(72) Inventors: Matt Gardner, San Jose, CA (US); Grant King, Pleasanton, CA (US); John Singleton, Reading (GB); Landon Wainwright, Alsager (GB)

(73) Assignee: 8x8, Inc., Campbell, CA (US)

( * ) Notice: Subject to any disclaimer, the term of this patent is extended or adjusted under 35 U.S.C. 154(b) by 904 days.

(21) Appl. No.: 17/827,554

(22) Filed: May 27, 2022

(51) Int. Cl.
*G06F 21/62* (2013.01)
*G06F 8/61* (2018.01)
*H04L 9/40* (2022.01)

(52) U.S. Cl.
CPC ............ *G06F 21/6218* (2013.01); *G06F 8/61* (2013.01); *H04L 63/08* (2013.01)

(58) Field of Classification Search
CPC ......... G06F 21/6218; G06F 8/61; H04L 63/08
See application file for complete search history.

(56) References Cited

U.S. PATENT DOCUMENTS

| | | | |
|---|---|---|---|
| 5,473,732 A | 12/1995 | Chang | |
| 6,424,935 B1 | 7/2002 | Taylor | |
| 7,236,932 B1 | 6/2007 | Grajski | |
| 8,788,535 B2 | 7/2014 | Bonev et al. | |
| 10,091,230 B1 * | 10/2018 | Machani | H04L 67/306 |
| 10,142,329 B1 | 11/2018 | Liu | |
| 10,318,617 B2 | 6/2019 | Gelfand et al. | |
| 10,616,345 B1 | 4/2020 | Quimette et al. | |
| 10,735,592 B1 | 8/2020 | Liu et al. | |
| 10,939,179 B2 | 3/2021 | Park et al. | |
| 10,949,619 B1 | 3/2021 | Arsanjani et al. | |
| 10,994,800 B2 | 5/2021 | Noguchi et al. | |

(Continued)

FOREIGN PATENT DOCUMENTS

| | | |
|---|---|---|
| WO | 2022/240433 A1 | 11/2022 |
| WO | 2022/256028 A1 | 12/2022 |

OTHER PUBLICATIONS

Mogilevsky, Daniel, John Nehrbass, and Rhonda Vickery. "Automated customizable containerization." Algorithms for Synthetic Aperture Radar Imagery XXVIII. vol. 11728. SPIE, 2021. (Year: 2021).*

(Continued)

*Primary Examiner* — Joanne G Macasiano
(74) *Attorney, Agent, or Firm* — Vista IP Law Group, LLP

(57) ABSTRACT

Example aspects concern systems and/or methods for deployment of datasets via a set of servers, a user interface and logic circuitry enabled to communicate a first type of dataset, including templatized or scripted commands, and a second type of dataset specific to and corresponding to one or more containerized applications (e.g., configuration-code or software clusters as may be used to update a data-communications system in different regions), over a broadband network, and to validate respective sets of authentication credentials for issuing the first and second types of datasets as being valid to effect respective uploads based on the first and second types of datasets. A CPU may deploy the datasets in response to converting the first and second dataset type to a common deployment (CD) format. The deployment may be in the CD format and is responsive to specific authentication.

20 Claims, 15 Drawing Sheets

(56) References Cited

U.S. PATENT DOCUMENTS

| | | | |
|---|---|---|---|
| 11,025,488 | B1 | 6/2021 | Arsanjani et al. |
| 11,044,338 | B1 | 6/2021 | Arsanjani et al. |
| 11,070,640 | B1 | 7/2021 | Arsanjani et al. |
| 11,196,866 | B1 | 12/2021 | Samat et al. |
| 11,425,252 | B1 | 8/2022 | Martin et al. |
| 11,445,063 | B1 | 9/2022 | Driemeyer et al. |
| 11,539,541 | B1 | 12/2022 | Driemeyer et al. |
| 11,551,005 | B1 | 1/2023 | Arsanjani et al. |
| 11,575,755 | B1 | 2/2023 | Arsanjani et al. |
| 11,575,791 | B1 | 2/2023 | Arsanjani et al. |
| 11,601,425 | B1 * | 3/2023 | Ponnuswamy ....... H04L 63/083 |
| 11,622,043 | B1 | 4/2023 | Samat et al. |
| 2003/0055974 | A1 | 3/2003 | Brophy et al. |
| 2004/0143559 | A1 | 7/2004 | Ayala |
| 2008/0086564 | A1 | 4/2008 | Putman et al. |
| 2009/0112875 | A1 | 4/2009 | Maes |
| 2009/0276215 | A1 | 11/2009 | Hager |
| 2010/0246800 | A1 | 9/2010 | Geppert et al. |
| 2011/0046960 | A1 | 2/2011 | Spier et al. |
| 2014/0100848 | A1 | 4/2014 | Shaffer et al. |
| 2015/0350443 | A1 | 12/2015 | Kumar et al. |
| 2016/0095056 | A1 | 3/2016 | Lebon-Schneider et al. |
| 2016/0227035 | A1 | 8/2016 | Kumar et al. |
| 2016/0301676 | A1 * | 10/2016 | Gounares ............ H04L 63/0428 |
| 2016/0349960 | A1 | 12/2016 | Kumar et al. |
| 2017/0006161 | A9 | 1/2017 | Riahi et al. |
| 2017/0052776 | A1 * | 2/2017 | Kotian .................... G06F 21/12 |
| 2017/0180346 | A1 * | 6/2017 | Suarez ................ G06F 9/45558 |
| 2018/0234550 | A1 | 8/2018 | Lifson et al. |
| 2018/0315000 | A1 | 11/2018 | Kulkarni et al. |
| 2019/0215249 | A1 | 7/2019 | Renard et al. |
| 2020/0342850 | A1 | 10/2020 | Vishnoi et al. |
| 2021/0048995 | A1 * | 2/2021 | Myers ................. G06F 11/1469 |
| 2021/0109732 | A1 * | 4/2021 | Mitra ......................... G06F 8/63 |
| 2021/0157973 | A1 * | 5/2021 | Pedersen ............... G06F 16/901 |
| 2021/0208859 | A1 * | 7/2021 | Kapadia .............. H04L 67/1097 |
| 2022/0308720 | A1 | 9/2022 | Korzhenevich et al. |
| 2022/0398097 | A1 * | 12/2022 | Smith .............. G06Q 10/06313 |

OTHER PUBLICATIONS

Van den Berg, Tom, Barry Siegel, and Anthony Cramp. "Containerization of high level architecture-based simulations: A case study." The Journal of Defense Modeling and Simulation 14.2 (2017): 115-138. (Year: 2017).*

TheSandWraith: How to merge iOS messages conversation feed? Apple Inc., https://discussions.apple.com/thread/6566339, 4 pages (Sep. 27, 2014).

Alex Heath. Merge Clears Up Confusion by Combining iMessages From Multiple Device IDs Right In iOS [JailbreakCon]. https// www.cultofmac.com/category/news/, 9 sheets (Sep. 29, 2012).

8x8 Admin Console, "Set up call park extension." 8x8, Inc. (2022), 1 sheet. https://docs.8x8.com/8x8WebHelp/admin-console/Content/Set_up_Call_Park_Extension.htm.

* cited by examiner

APPARATUS AND METHODS FOR DEPLOYMENT OF DATASETS

OVERVIEW

Exemplary aspects of the present disclosure are directed to systems for deployment of datasets (e.g., software and/or logic configurations) for updating operations and/or services as may be used by different servers, for example, where the different servers may be located in different geographic regions and may require multiple levels of updates and perhaps rollbacks to previous dataset versions or as may be applicable, previous versions of deployed software. Given the complexities of and ongoing demand for new and revised services, such updates and rollback are becoming increasingly important.

Containerized applications and related distribution and management protocols have been developed for deploying software-based clusters in cloud-based applications on physical and virtualized system. Containers are sometimes referred to as packaged sets of software to be used in application services and once the containerized software is deployed across different environments and geographic regions, the software may be used for various purposes. These purposes may including one or more of testing the software, iterating efforts to further develop the software, and ultimately implementing application services with the deployed software, and oftentimes related configuration coding, by running the software on engines (e.g., servers) which may be involved to provide and/or execute specific applications. Because containers need to be managed for tasks such as scheduling, load balancing, and distribution, these forms of protocol-specific tools have been implemented to permit developers to control such management functions. An example of a protocol-specific tool for such containerized applications is Kubernetes. There are a number of related management tools with protocols specific to Kubernetes-type containerized applications with examples including a package-manager offering by Helm and including a platform-as-a-service (PaaS) offering that uses operating system virtualization to deliver containerized software available by Docker.

There are a number of disadvantages to using such protocol-specific tools for providing containerized applications. As one of numerous examples, such tools typically involve a very detailed understanding of the required protocol involved with such containerized applications and/or their management tools. Using the above-discussed context of deployment of software as a representative example of dataset deployment, the software-originating engineering development teams would typically include engineering personnel who have specialized training on how to implement the specific tools for using the protocol necessary to deploy and understand the management of the containerized-applications tools. Further, once deployed, it is common that smaller engineering development teams would modify the deployed software, for example, to customize software to fit specific local needs, and requiring such smaller teams to include engineering personnel with such specialized training can be burdensome and lead to critical mistakes in the management of the engineering software efforts and/or the target uses of the applications being served by engineering software efforts. As specific examples, engineering personnel without such specialized training may not understand how to push the datasets or software to each cluster and/or what levels of the datasets or software are currently enabled at each node. Moreover, it is not uncommon that mid-level engineering personal with such training are used to address this specialization issue; however, when involving such mid-level engineering personal, significant delays (e.g., from days to many weeks) may ensue before the requested actions are implemented.

Furthermore, management of deployment of protocol-specific tools for using service clusters is oftentimes problematic. Traditionally, this is a manual process with less auditability and traceability with respect to prevention of outages and improper deployments (e.g., sanction issues). Additionally, it can be difficult to rollback to previous versions, while managing the effect of a rollback on other services/clusters of services. When a service cluster goes down, there can be issues with respect to at least latency and availability of services. If a container goes down, it may be important that the system be able to quickly deploy another container so as to reduce latency and maintain high availability of services.

These and other matters have presented challenges to efficiencies and integrity of operations for deploying and managing containerized applications for a variety of applications.

SUMMARY

Various example embodiments are directed to issues such as those addressed above and/or others which may become apparent from the following disclosure. In certain specific examples, aspects of the present disclosure are directed to enabling software developers and client entities to prepare, update and rollback containerized applications, via deployment in a various designated geographic regions, without needing to learn the intricate and often complex aspects of the specific protocols and command structures commonly used in connection with protocol-specific containerized applications tools.

In certain specific embodiments, example aspects of the present disclosure are directed to systems and/or methods for deployment of datasets via a set of one or more servers ("server set"), a user interface and related logic circuitry enabled to communicate a first type of dataset, including templatized or scripted commands, and a second type of dataset which may be organized in a containerized applications. The server set, along with the user interface and related logic circuitry, may be used to enable the originating software developer and/or third parties (such as client entities) to obtain, update and manage one or more data-communications services by using templatized datasets, such as software and sets of configuration codes, in different regions served by the data-communications system(s). Once received and authenticated, the server set and related processing circuitry (CPU) may upload, test and/or and deploy containerized code using a common deployment (CD) format, which is derived from the CPU converting the first (templatized) dataset type and the other (second) dataset accordingly into the CD format.

More specific examples of the present disclosure may build on the above types of apparatus and/or methods, and the following discussion provides representative examples in this regard. In one example, the system includes a communications-services document deployment platform which may operate in cooperation with a set of one or more servers to receive instruction documents from at least one code-origination entity. For example, consider that the data-communications services system was built using software distributed via protocol-specific containerized applications tools as the second dataset type. The user interface and related logic circuitry may then be used to communicate templatized or scripted commands (as the first dataset type) to update the system in selected regions and/or for selected client entities. While the second dataset type would typically involve complex operations and significant training to upload, distribute and manage the software processes, the first dataset type may use adapted user interfaces, templatized documents and/or scripted commands to update and customize the software-based system. Such updates and customizations need not involve any understanding of the protocol-specific containerized applications tools associated with the second dataset type.

Among such more specific examples, the templatized or scripted commands may be in a format that is independent of a format used with the second type of dataset specific and, in some instances, may be provided via template-prompted entries and selections or via a high-level language and in a form that corresponds to aspects of a template. In this manner, such a templatized document may specify one or more: variables, selections, content in data fields (e.g., alpha/numeric or other codes, functional directives, and configuration codes) for interpretation and/or execution by computer circuitry, and with entered and/or selected variables or values included and specified for the computer circuitry to use, manipulate and/or respond to.

Among various specific examples, the second type of dataset may include containerized applications which are provided using a protocol-specific tool having a set of one or more computing processor nodes to run the containerized applications, with each such cluster having a respective control plane to maintain states of the cluster(s) by providing tracking data to indicate which applications are running and indicating any container images being used.

As further related specific examples, the CPU may be configured to: include a second interface to receive, over a broadband network, authentication credentials for issuing the first and second types of datasets merged together into the CD format (e.g., with authentication credentials required by two specified individuals such as a content author and a supervisory individual); and/or manage and track current and past deployments, for each of said at least one of the first type of dataset and the second type of dataset, by maintaining deployment status data and by providing one or more authorized entities access to the deployment status data.

In yet another specific example in such a context, the CPU is further to deploy a rollback, also in response to the respective sets of authentication credentials, said at least one of the first type of dataset and the second type of dataset for access and use by endpoint devices, and is further to manage and track the deployed rollback by maintaining deployment status data and by providing one or more authorized entities access to the deployment status data, wherein the deployment status data indicates which current applications are authorized to be running and indicates which if any container images are authorized to be used.

One or more of the above specific examples may also involve the following: the communications circuit and the CPU may be communicatively integrated via a private communications link; the first type of dataset may correspond to software for providing client-specific data communications services (e.g., with the client-specific services being updatable by the service provider or by the client); the user interface may be configured for operation on behalf of a software developer to send the first type of dataset, including templatized or scripted commands, to the central processing and deployment circuit; the first type of dataset may correspond to software configured for providing data communications services; and/or the deployment status data may indicate identification and authorization information for applications authorized to be running and, if provided to the central processing and deployment circuit, indicate current and past container images.

While the present disclosure may provide specific examples around the creation and integration of services, it is to be recognized that the present disclosure is intended to apply to the creation of not only services but applications as well. That is, applicability of the present disclosure applies to developer management of any type of application and/or service.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, each of which is in accordance with the present disclosure and in which.

Figures 1A, 1B:
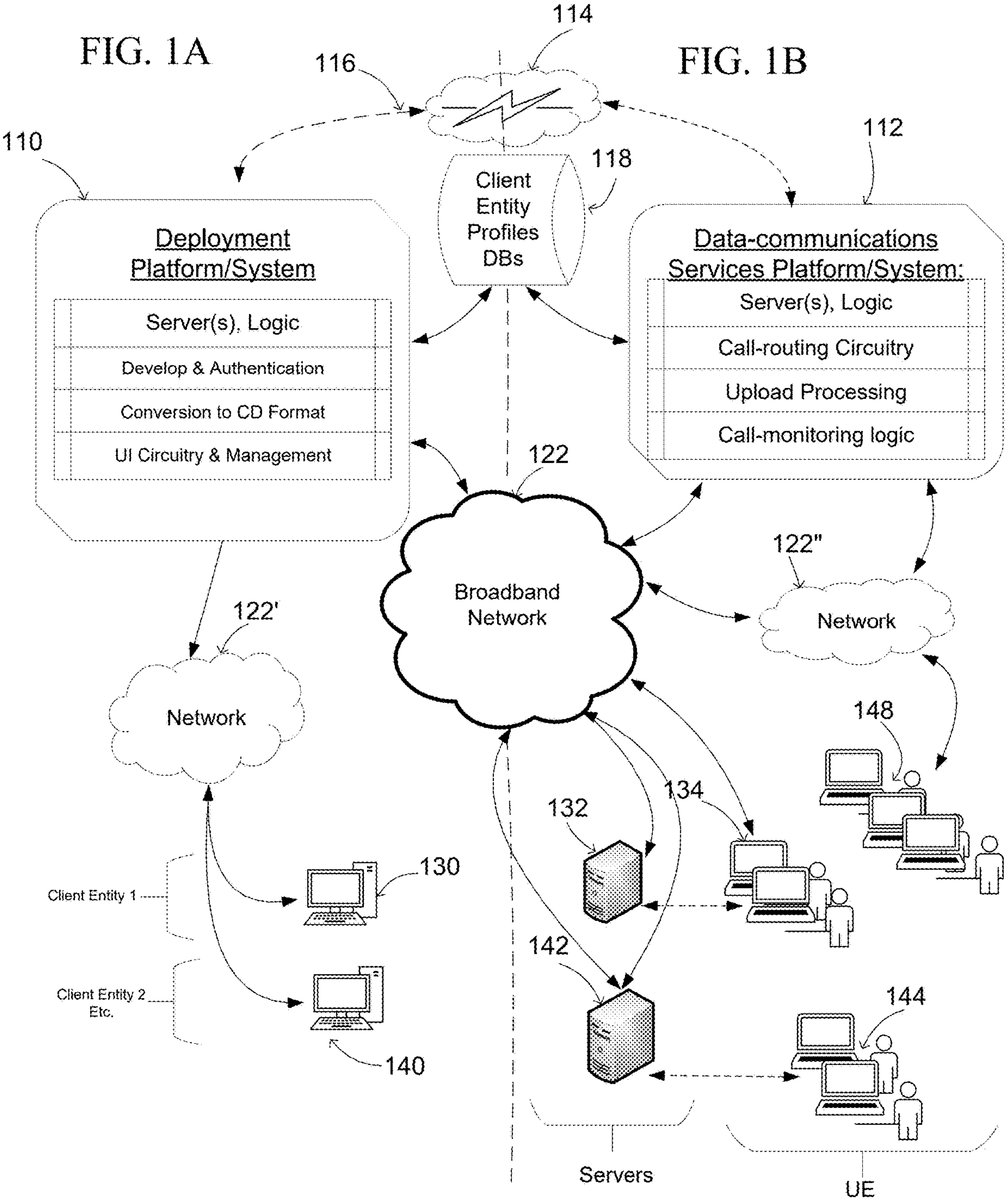
FIG. 1A and FIG. 1B collectively show an integrated set of communications circuits with FIG. 1A on the left side showing a system-level diagram of an exemplary dataset-deployment system, and FIG. 1B on the right side showing a system-level diagram of data-communications services system which is responsive to operations of the dataset-deployment system of FIG. 1A.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving the deployment of datasets such as software and logic codes for configuring application in various nodes or servers located in the cloud and/or different geographic regions. Because containerized applications are commonly used in this regard, such aspects of the present disclosure are compatible for working with protocol-specific tools for utilizing such clusters (e.g., whether such tools are proprietary to the code-originating system provider or are conventional such as Kubernetes® clusters and other types including those available from Helm® and Docker®). In certain implementations and exemplary contexts, aspects of the present disclosure have been shown to be beneficial when used in the context of deploying software (e.g., host software) on behalf of an originating software-engineering team and also deploying other software to be used with the host software where the other software is provided for deployment via such protocol-specific tools. While not necessarily so limited, various aspects may be appreciated through the following discussion of non-limiting examples which use such exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

According to the present disclosure, one specific embodiment exemplifies a type of implementation as discussed above, wherein the datasets correspond to software to be deployed for use by a set of one or more servers in a cloud-based (aka cloud-native) data-communications system which requires or is benefited by the provider of the system generating so-called origination software capable of being updated or customized, via protocol-specific cluster tools, by other engineering personnel (e.g., customers of such services and/or third parties working on behalf of such customers or the system provider). As an example, once the software (original and/or updated versions) is deployed, it may be used in a data-communications system implementing a software-services-type platform (e.g., SaaS for Software as a Service, Paas for Platform as a Service, etc.) through which specific data-communication services are provided to client entities based on templatized or scripted commands. For providing such services, the client entities may have respective user equipment including a variety of user endpoint devices registered in a database which is accessible to and/or managed by the data-communications system, and the templatized or scripted commands may be used to register and enable such user equipment to use the services.

In certain related embodiments, example aspects of the present disclosure involve a system and/or method for deployment of datasets via a set of one or more servers ("server set"), a user interface and related logic circuitry enabled to communicate a first type of dataset, including templatized or scripted commands, and a second type of dataset which may be organized in containerized applications (e.g., using protocol-specific containerized applications tools such as Kubernetes, Helm, Docker, etc.). The server set, along with the user interface and related logic circuitry, may be used to enable the originating software developer and/or third parties (such as client entities) to obtain, update and manage one or more data-communications services by using templatized datasets, such as software and sets of configuration codes, in different regions served by the data-communications system(s). Once received and authenticated, the server set and related processing circuitry (CPU) may upload and deploy containerized code using a common deployment (CD) format, which is derived from the CPU converting the first (templatized) dataset type and the other (second) dataset accordingly into the CD format. Accordingly, the deployment effects respective uploads of the datasets to targeted nodes in geographic regions as may be designated by the creator of the first (templatized) dataset type.

In the above manner and according to exemplary aspects of the present disclosure, the following terms are defined and/or used by the present disclosure in a limited context as follows. "Converting" the first and/or second dataset types to "the CD format" refers to preparing a containerized application, such as a service cluster, which may be authorized for deployment and which, when effected, causes respective uploads of the datasets for carrying out applications services at targeted nodes in geographic regions (e.g., as may be designated by the first (templatized) dataset type). More specifically, "converting the first dataset type" to the CD format refers to the forming, before deployment, of containerized code (e.g., as software and/or logic-circuit configuration data) which would provide application services after being complemented with customized customer-deployment information (e.g., data to identify relevant customer or customer profile, locations for deployment, specific services to be deployed). In a related sense, "converting the second dataset type" to the CD format refers to the forming of the containerized code, before deployment, by supplementing the software and/or logic-circuit configuration data of the first dataset type, with customized customer-deployment information (e.g., data to identify relevant customer or customer profile, locations for deployment, specific services to be deployed) as may be provided in templatized and/or code scripted form. The term "containerized application" refers to a packaged set of application-specific code arranged as a single executable package of software that bundles application code together with all of the related configuration files, libraries, etc., and when deployed, the containerized application is to be used in a designated group of circuit-based pods in a "cluster" such that each of the pods performs a common set of activities (e.g., one or more data-communication services) which provide a specified set of functions and may be assigned with a unique IP address for access, tracking and overall management including updating and/or rollbacks.

In the above cloud-based data-communications system and certain other specific example embodiments, aspects of the present disclosure involve a system and/or method for deployment of datasets via a set of servers, a user interface and logic circuitry enabled to communicate a first type of dataset, including templatized or scripted commands, and a second type of dataset specific to and corresponding to one or more different containerized applications, over a broadband network, and to validate respective sets of authentication credentials according to a client-entity profile stored by the system and used before the first and second types of datasets are deemed as being valid and/or for effecting respective uploads or deployments based on the first and second types of datasets. A central processing and deployment circuit (e.g., "CPU" or server configured to deploy) may deploy the datasets in response to converting the first and second dataset type to a common deployment (CD) format. The deployment may be in the CD format and is responsive to specific authentication. Using such a system, different types of new and previously-available services may be provided or revised by the provider of the data-communications services and such services may be customized by the provider and/or by engineering teams using (e.g., subscribing to) such services.

With regards to the second type of dataset, in certain examples, the containerized applications may be implemented by protocol-specific tools (e.g., Kubernetes by Google, and/or other related protocol-specific tools such as those available from Helm and Docker), each having its own specific protocols for characterizing, deploying and managing clusters or containerized code for updating software-implemented applications. Regardless of the type of protocol-specific tool used in connection with the operations of the related clusters, the above-noted second type of dataset uses at least one such protocol-specific tool for operations concerning a set of one or more computing processor nodes to run containerized applications. As may be applicable to each such example of the second dataset type, the clusters may be characterized by way of a control plane, wherein the respective control plane is to maintain a plurality of states of each cluster and this may be accomplished by providing tracking data to indicate which applications are running and indicating any container images being used. According to exemplary aspects of the present disclosure, each cluster includes code relevant to one of a plurality of data-communications services available by a certain data-communications system or platform and before deployment, and a CPU circuit (as may be integrated with the system) that receives the templatized and/or scripted commands and converts data therefrom for integration with the second type of datasets.

More specific examples of the present disclosure may build on the above types of apparatus and/or methods, and the following discussion provides representative examples in this regard. In one example, the CPU is part of a communications-services document deployment platform having the one or more CPU servers communicatively-integrated to receive instruction documents from at least one origination entity, wherein the instruction documents include the templatized or scripted commands and are deployed to provide updates of communications services specific to and/or customized for providing one or more data-communications services to certain client entities. Among such more specific examples, the templatized and/or scripted commands are in a format that is independent of a format used with the second type of dataset and that is used to select a type of service to be provided by data communications system for designated service regions on behalf of a specific client entity.

In certain specific examples, the templatized or scripted commands may be instructions or directives provided in one or more high-level languages such as XML, and certain easy-to-used form-based documents may be used to provide the templatized or scripted commands. For example, such form-based documents may be used to designate (e.g., as fill-in-the blank entries) and to provide certain types of directives or commands (or collectively, "instructions"). As one of various more specific examples, such templatized and/or scripted commands are used in a format so as to spur a user to complete a document or a file. The document or a file may be pre-formatted to guide/illustrate a reviewer of the document or file how the document or file is to be completed with entries or instructions, and oftentimes to be completed with entries and instructions. As another example applicable to the above-characterized or another type of data-communications system providing services, a graphic user interface (GUI) may be used by an engineer or administrator (on behalf of a client entity) to select a type of service to be provided by the data communications system for designated service regions on behalf of a specific client entity, or to enter XML or other high-level language instructions which may be interpreted for the same purpose (e.g., with development-specific commands such as "if approved by Supervisor John Smith by [date specified], then select Service G", where Service G may pertain to an email or VM-specific service). In each instance, the user interface (UI) or GUI is used to provide entries and related instructions in a pre-formatted template. As another more specific example, the UI may simply prompt entries for selecting/adding services for SMS-type communications in certain branches and/or geographic regions. The file or document may include a pre-formatted template that is selected via a hierarchy of different types of services from which a client-entity administrator may choose to complete the file or document, and with the selected pre-formatted template being designed to prompt the administrator to use such high-level commands and related entries (e.g., identification information for the media servers and for user equipment applicable to the branches and/or geographic regions). Similarly, the selected pre-formatted template may include selectable options (e.g., using if/then type steps) to select available commands for the client to select for implementation of specific details of the service (e.g., do not convey more than 100 messages during any given 24-period without automatically notifying a supervisor of the client entity). As should be apparent for a given application, any particular examples are not intended to be limiting, and the number and types of instructions would typically vary between different types of needs and services involved.

As further specific examples relating to the above non-limiting contexts, the CPU may be configured to: include a second interface to receive, over the broadband network, pre-specified authentication credentials for issuing the first and second types of datasets. This process may be used to deploy the first and second types of datasets for access and use by endpoints in response to a deployment request. The process may also be used by the central processing and deployment circuit to recognize or discern when to authorize actions by supervisory personnel overseeing the staff operating the UI(s), and/or to manage and track current and past deployments, for each of said at least one of the first type of dataset and the second type of dataset. This may be done by maintaining deployment status data and by providing one or more authorized entities access to the deployment status data.

In yet other specific examples in such contexts, the CPU may also be configured to deploy a rollback version of the data set (or software version as may be applicable) in response to the respective sets of authentication credentials, with the CPU being further configured to manage and track the deployed rollback by maintaining (and providing access to) deployment status data and by providing one or more authorized entities access to the deployment status data, wherein the deployment status data indicates which current applications are authorized to be running and which, if any, container images are authorized to be used.

In more-detailed/proof-of-concept examples, aspects of the present disclosure are directed to a method involving an engineering-document deployment system which includes a communications circuit and one or more user interfaces, each with logic circuitry for enabling users to communicate (e.g., upload) documents to the engineering-document deployment system, and which further includes central processing and deployment logic circuitry. The deployment system enables developers to quickly and easily create a services/service application cluster without complex coding. As noted below, this may be achieved in part by using an internal developer framework such as Cloud8™ and/or Galactic™ (both available from the instant assignee, 8×8, Inc.) and by the system providing and automatically managing deployment of the software, via the CD format, for delivery of such service(s) through use of a processor-based data-communications server system.

FIG. 1A and FIG. 1B collectively show an integrated set of communications circuits with FIG. 1A on the left side showing a system-level diagram of an exemplary a dataset-deployment system 110, and FIG. 1B on the right side showing a system-level diagram of data-communications services system 112. In more specific embodiments, the systems may be implemented and integrated in different forms. As examples, the systems may use the same CPU-based processors, logic circuitry and servers, and alternatively may be partially separated or entirely in terms of secure and isolated circuitry and/or software modules operable by such circuits. As illustrated, the systems 110 and 112 are depicted as being entirely separated by different sets of secure circuitry and software modules operable by such circuits. In each instance, however, the systems 110 and 112 are communicatively integrated over a network 114 (e.g., Internet, local area network, cellular network(s), etc.) and/or a private high-speed link 116 which may also be provided by such a network via a point-to-point communication channel.

The systems 110 and 112 may use, on behalf of client entities for which profile data is stored in database(s) of memory 118, one or more broadband networks which may be common or different (e.g., networks 122, 122' and 122"). Through such a broadband network, the dataset-deployment system 110 may communicate with respective CPU's 130 and 140 (e.g., servers, user equipment, etc.) of various client entities which are authorized to provide the first type of data sets, in a templatized and/or scripted-command form, for use by the dataset-deployment system 110. The system 110 may include various circuits for receiving and processing the first type of datasets, including as examples, servers for communicating over the network(s), user-interface logic for prompting certain inputs from user equipment (e.g., authentication data, template-specific data, scripted commands, menu-selectable options, etc.), conversion logic for converting the first and/or second dataset types into a common format for deployment, and other computer processing circuitry configured to monitor, manage and/or report on the status of deployed containerized applications.

Using such circuitry, the dataset-deployment system 110 translates such received datasets of the first type, and then processes and merges these data sets into a common deployment (CD) format with non-customized containerized code (second type of dataset) for providing data-communications services according to designations indicated by the received datasets. Among other example scenarios, the CD format may be based on (same as or derived from) a format that closely tracks with non-customized containerized code (i.e., second type of dataset), or may be an entirely different formatting for containerized applications.

In a more specific example, by using the CD format to provide customized containerized code according to designations of the first dataset type, the dataset-deployment system 110 sends the customized containerized code to the data-communications services system 112 via the network(s) and/or link as discussed. The data-communications services system 112 may then be operative with the updated and deployed software and code being used to provide the customized services.

In various specific (non-limiting) examples, the data-communications services system 112 may be implemented as a cloud-based data-communications system with a CPU configured as part of or communicatively integrated with a communications-services document deployment platform having one or more CPU servers communicatively-integrated to receive instruction documents from the entity which is to originate the software for providing the data-communications services. While the communications-services document deployment platform of system 110 operating in conjunction with the system 112 may advantageously facilitate distribution of datasets for such services, in a typical application the system 112 may implement, test and/or run initial sets of the deployed software/code on such a data-communications system platform (e.g., Cloud-based servers of system 112) without further participation from the system 110 and/or with the system 110 merely monitoring certain status indicia associated with the software/code being deployed to provide such data-communications services.

As an example, FIG. 1B depicts one of various types of data-communications system platform in system 112 for providing data-communications services through servers 132 and 142, with routing circuitry for routing incoming calls to/from client entities' user equipment (UE) 134, 144 with calls involving trunking of such UE via respective servers 132 and 142, and also more directly routing call to/from UE 148. The system 112 may also include quality-of-service monitoring equipment, include circuitry to aggregate processed/monitored calls, provide call center operations, and issue suggestions and routing to resolve issues discerned while monitoring calls (e.g., based on artificial intelligence and on previous call-history data for the purpose). In such systems, examples of data-communications services may be directed to services involving these above-types of circuitry and features in connection with the services provided for network-enabled user equipment, and with exemplary data-communications services including one or more of the following: VoIP (voice over Internet Protocol), SMS messaging, email, chat, etc. Non-limiting examples of network-enabled user equipment 134, 144 and 148 include mobile phones, desk-phone stations, desk-top CPUs, and various other types of stationary and portable computing devices. For further information and more specific examples of data-communications services in a system, reference may be made to U.S. Letters Patent Nos. 10,944,800, 10,949,619 and 11,044,338; each of these references is assigned to the instant assignee, and incorporated herein by reference generally and specifically regarding such devices and services and the operations involving operations at and between such devices and the exemplary data-communications systems providing such services.

According to one specific example of the present disclosure, by using the communications circuit and user interface (UI) logic circuitry for managing the UI, such a method includes: receiving a first type of dataset (e.g., including templatized or scripted commands) from one or more of the software originator(s) and/or one or more client entities; receiving a second type of dataset specific to and corresponding to one or more different containerized applications (e.g., a protocol-specific tool for using containerized applications) from one or more of the software originator(s) and/or one or more client entities; and validating respective sets of authentication credentials for issuing the first and second types of datasets as being valid to effect respective uploads based on the first and second types of datasets. Via a central processing and deployment circuit which may include one or more CPU servers, the method further includes converting the first type of dataset to a common deployment (CD) format, converting the second type of dataset to the CD format, and a deployment step. The deployment step involves deploying, in the CD format and in response to the respective sets of authentication credentials, at least one of the first type of dataset and the second type of dataset for access and use by endpoint devices in one or more regions which are designated by each of the first type of dataset and the second type of dataset.

In connection with the above system, various types of known tools may be used for facilitating use of the system. As examples, the communications circuit and the UI-associated logic circuitry may be implemented using a software developer framework which provides developers a rich or robust user experience by enabling developers to create and integrate services with existing service clusters of an organization. For example, Cloud8™ may be used in this regard by developers to provide such a rich or robust user experience without requiring the developers to install local versions of different developer technologies. One or more exemplary developer framework tools (e.g., Cloud8™ and Galactic™) is uniquely programmed to provide developers with functionality baked in that improves the service creation process as well as the process to integrate a service into software platform (e.g., with other existing services). Among other technical advantages, with this type of framework and user experience developers do not need to know how to code for the developer technologies to create and integrate services into one or more software platforms, thereby removing a technical burden of developers having to understand multiple different software frameworks and applicable programming languages. Among other non-limiting examples, an exemplary developer framework tool is programmed to correspond to data entry prompts, guiding a user through a GUI, to enter data necessary for service creation and integration, to thereby enable a developer framework tool to automatically execute pre-programmed, back-end processing that automatically creates a service, cluster data for that service, and associates clustered data for that service with other services/clusters of a software platform. Non-limiting examples of types of data prompts for entry into a GUI of an exemplary developer framework tool comprise but are not limited to: service creation information (e.g., service name/identifier, description of a service, porting and configuration data (e.g., server port/management port)); developer-specific information (e.g., team information, contact information, and configuration information related to a software platform); database information; and developer framework information (e.g., messaging, and UI/UX specific data attributes). Additionally, exemplary developer framework tools are adapted to auto-populate key data prompt fields to streamline the service creation and integration process. That is, software platform information (of one or more software platforms) may be automatically retrieved and integrated into a developer framework so that developers do not have to enter all necessary information or even lookup specific data that may be necessary for service creation and integration. As non-limiting examples, data fields/prompts may auto-populate with version-specific information (e.g., a best/most recent version to use for deployment) for service integration, database information, and/or developer framework information (e.g., kick-starter GUI information to build/scaffold a UX on top of a newly-created service).

Once data prompts are completed by a developer, an exemplary developer framework tool automatically executes processing operations to create a service, data files or artifacts (e.g., an archived file format such as a ZIP file) to support service creation and integration relative to a software platform for which the service will be integrated. For example, an exemplary developer framework tool may be configured to automatically execute processing operations including but not limited to: lookup of software platform data (one or more applicable software platforms) to automatically build a service and integrate that service into a software platform; building of data files artifacts for service creation and integration; database creation; pushing of repositories; security scanning; association of services (e.g., core services of a software platform); and linking of other developer framework tools to aid service creation and integration (into a software platform), among other examples. Data files/artifacts that are automatically created for a developer are further configured to include data types that foster automatic loading within a development environment, for example, when such files/artifacts automatically code for a developer when loaded into a development environment. This further improves processing efficiency with service creation and integration when working with files within a development environment. While some of the service creation process may be manual in some cases (e.g., creation of a database), the majority of the tasks of service creation and integration are taken care of on behalf of a developer, so that the developer does not have to automatically code (from scratch) for service creation and integration. This further improves processing efficiency for service creation and integration as well as enables developers to solve development issues for organizations without having to invest time needed to learn application functionality, programming languages, etc.

For developing and/or integrating newly-created services such as data-communications services in a data-communications system as discussed above, a software development framework may be used to tier or "scaffold" the newly-created services with separation of related levels or hierarchies in categories such as different forms of quality-of-communication monitoring services, different types of selectable data-communications available from the system provider, etc., and GUI/UI functionality. As one example of such a software development framework, the Galactic™ framework tool may be used (as noted above, such tools are not limited to Galactic™ and Cloud8™ which are available from the instant assignee).

According to further aspects of the present disclosure, automated management of deployed services is provided through such UI logic circuitry and this management may be implemented in a way that is auditable and traceable (e.g., to prevent outages and improper deployments) and that is used to easily: identify states of clusters of services; manage data (and metadata for clusters); and manage releases (including sanctioning, tickets for releases, comparison of versions of deployment, rollbacks, etc.).

Figure 1C:
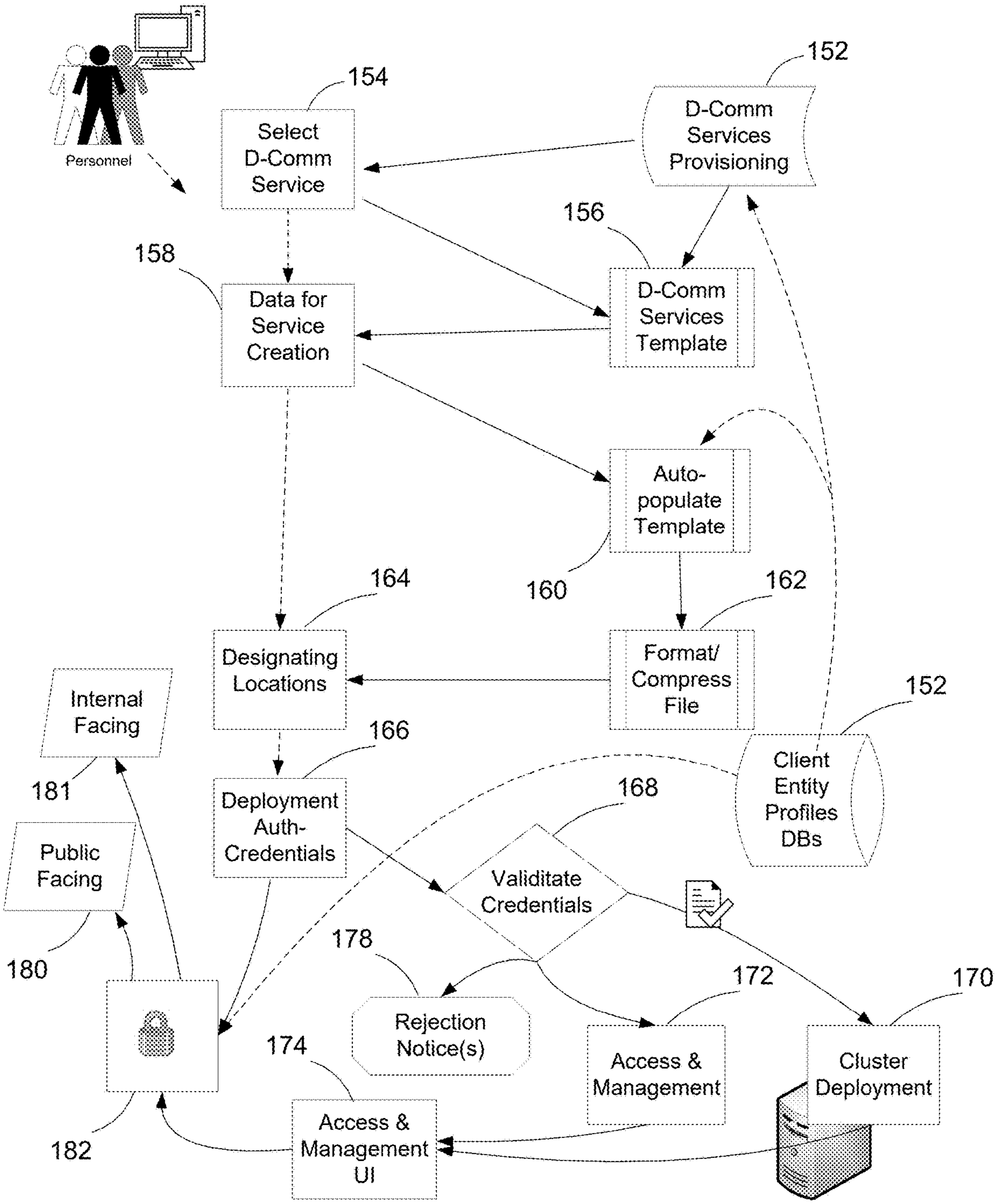
FIG. 1C is a data-flow diagram showing one of various approaches for using the interactive system or systems of FIG. 1A and FIG. 1B.
Figure 2A:
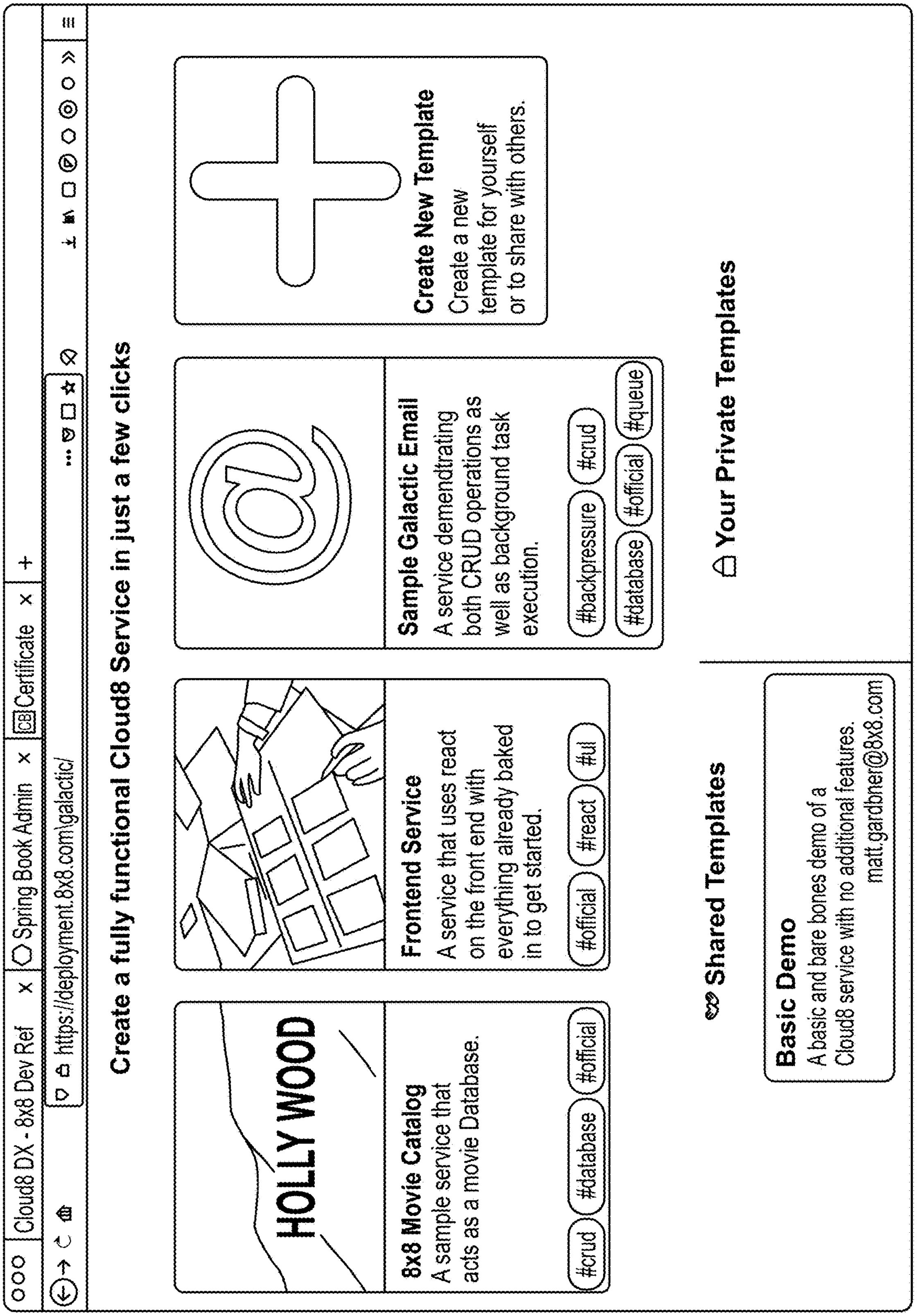
FIGS. 2A, 2B, 2C, 2D and 2E are screen shots which collectively illustrate aesthetic aspects in connection with one of various data-flow approaches for creating a deployable data-communications service and which individually illustrate respective examples of forms of respective documents useful in the exemplifying data-flow approach.

FIG. 1C is a data-flow diagram showing one of various approaches for using the interactive system or systems of FIG. 1A and FIG. 1B to create the templatized and/or scripted commands of the first dataset which, ultimately, may be used to deploy data-communications services as customized for specific requirements of client entities. For more specific examples relating to various blocks discussed below in connection with the exemplary process flow of FIG. 1C, reference may be made to certain of the screen shots depicted in FIGS. 2A-2E and FIGS. 3A-3I. The screen shots FIGS. 2A-2E illustrate one of various data-flow approaches for creating a deployable data-communications service, and the screen shots of FIGS. 3A-3I show aesthetic presentations for display screens, showing organizations of status categories involving tracked and/or managed data-communications services after deployment steps and related activities as discussed in connection with FIGS. 2A-2E. For example, FIG. 2A illustrates an example of a specific screen view which shows types of services which, via an interactive UI, may be considered selectable by or on behalf of a customer entity. In connection with the exemplary architecture of FIG. 1A, authorized personnel of client entities may use displays of UE 130 and 140 to view such screens and, if applicable, may also send and/or receive data to the system 110 by way of its previously-discussed aspects including, as examples, server(s) and UI and management circuitries.

Turning now to FIG. 1C, the depicted example may begin at block 154 where the system 110 may present authorized personnel of a client entity with an option to select one or more services (e.g., email, VM, SMS messaging, quality-of-service monitoring, etc.) or types of services (e.g., access to a movie catalog, frontend services to get new customers started with using the system of 112, customization of existing services via a template, etc.). Via the UI of the system 110, the authorized personnel may use a cursor to select one of the services or types of services. From block 156 of FIG. 1C, flow proceeds to block 158. Selected as such, the selected services or types of services become the first type of datasets which are to be processed by merging with the second type of datasets into a common format which the servers of the system 110 uses for deployment. This common deployment format may be referred to as a common deployment (CD) format.

Figure 2B:
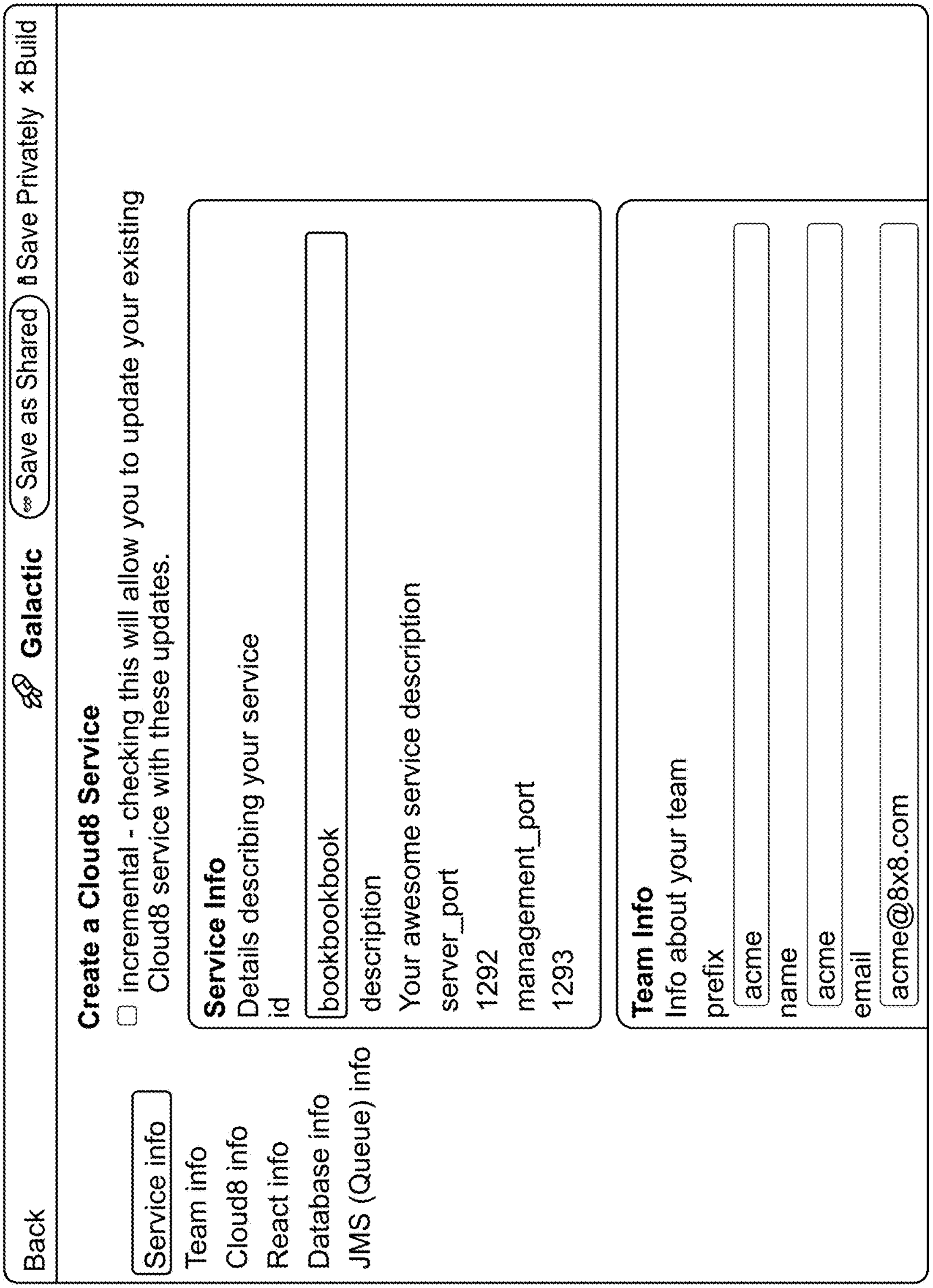
Figure 2C:
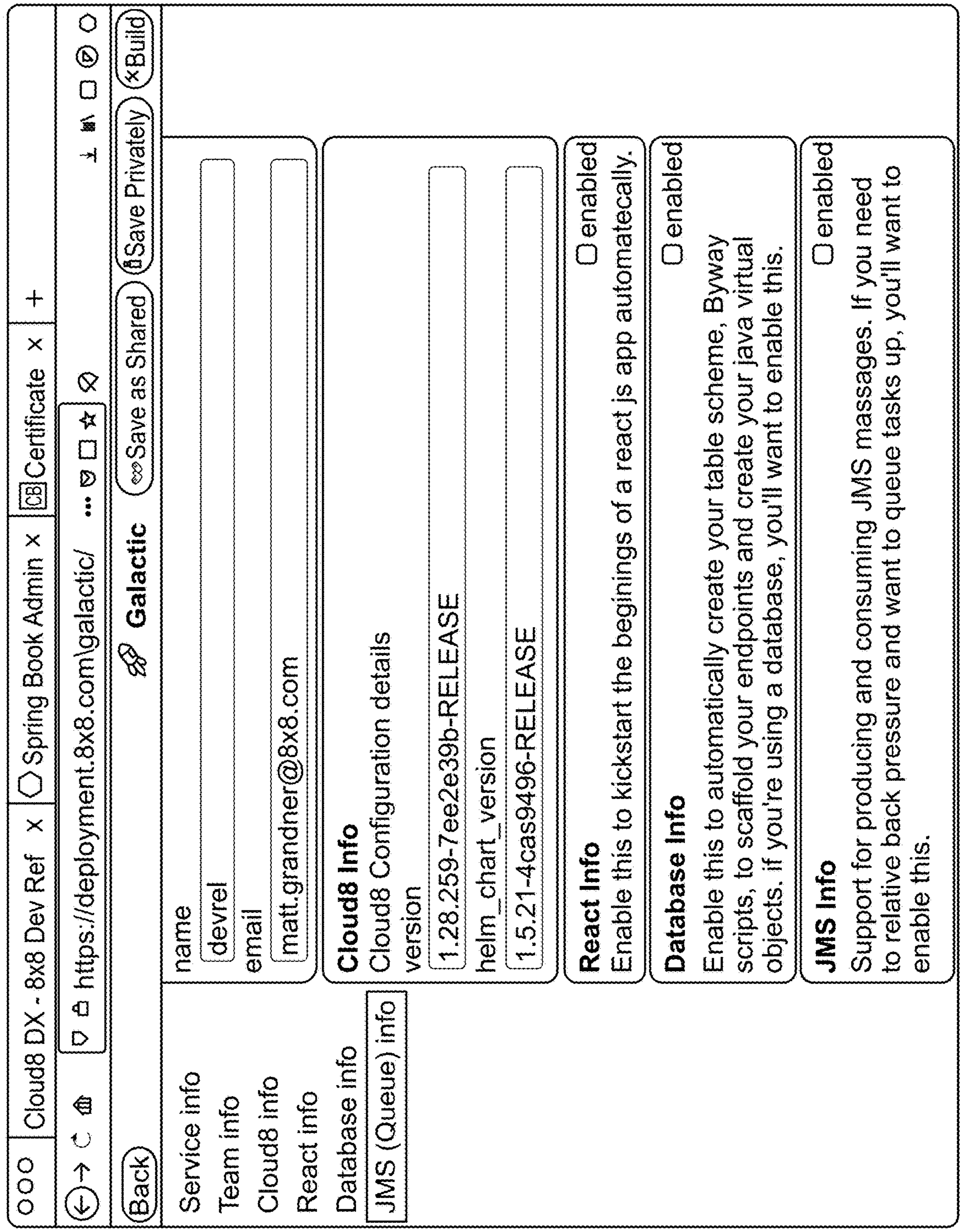

At blocks 158 and 160, the system (e.g., 110 of FIG. 1A) produces one or more templates such as exemplified at FIGS. 2B and 2C. Such templates include entry fields which may be filled in, again via the above-mentioned UI of the system 110 and the client entity's UE (user equipment). More specifically, FIG. 2B is a screen shot of a template showing entry fields for data that may be entered to create one of the services depicted in FIG. 2A. Non-limiting examples of data prompts and specific functionality of exemplary developer framework tools (e.g., ability to auto-populate data fields and automatic execution processing to create a service and/or integrate that service into a software platform) are described herein.

FIG. 2C is a screen shot of a template showing entry fields for data that may be entered to facilitate auto-population of data relating to creation of one of the services depicted in FIG. 2A. If a profile (or related memory) has relevant data stored for the client entity, as in the screen shot of FIG. 2C, the UI may automatically populate various fields such as typical communication/contact designations and location identification aspects which, for example, may have been previously used by or associated with the client entity. This data, as provided by way of such templates with entries to be filled in, may be referred to as the second type of dataset(s) and including such templatized data. Other examples of data fields and associated prompts have been described in the foregoing description. It is to be recognized that the present disclosure is intended to be applicable to enable capture of any type of data (e.g., data fields/data prompts) that would be necessary for automating creation of a service and automating integration of a service into one or more software platforms.

Figure 2D:
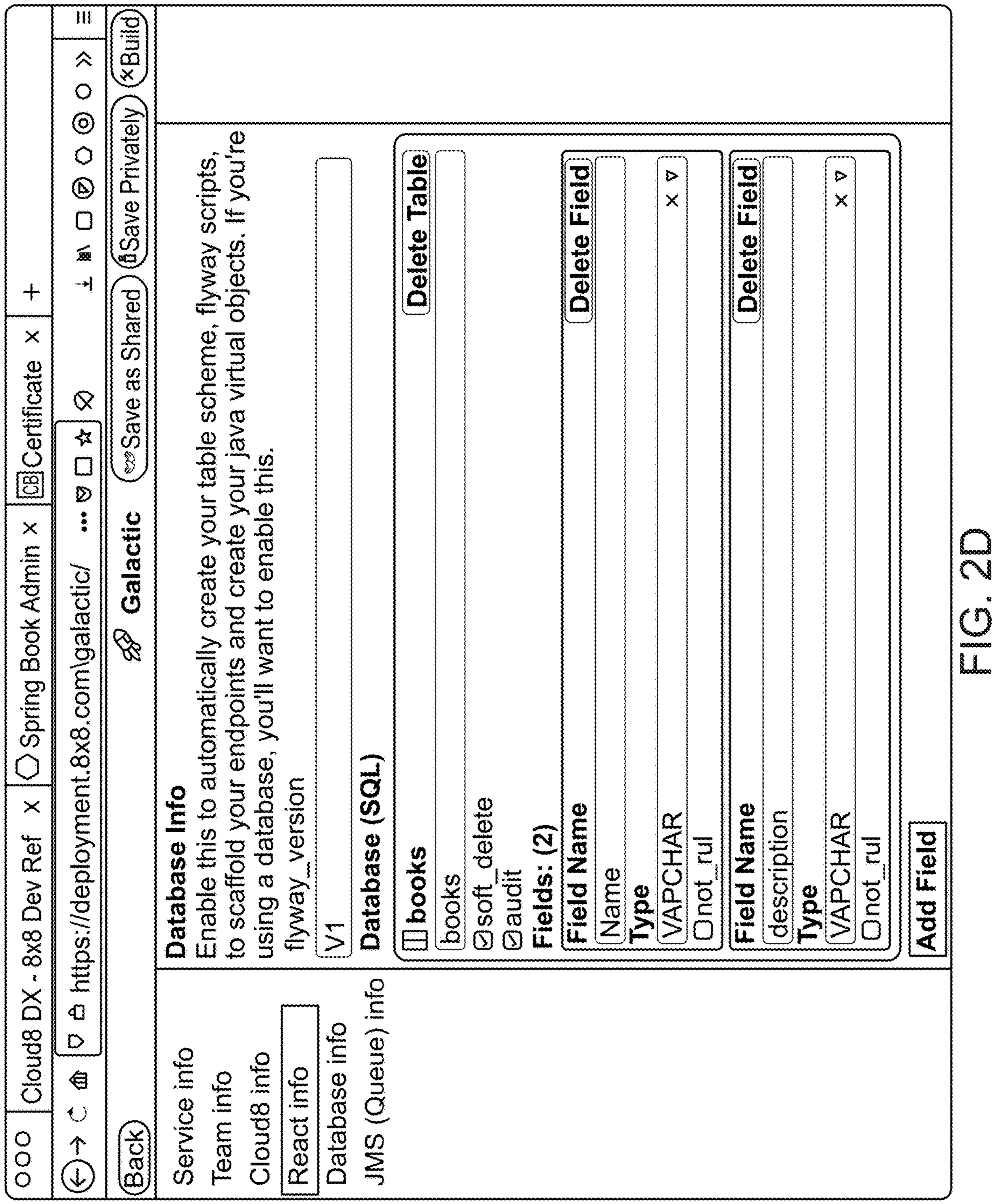
Figure 2E:
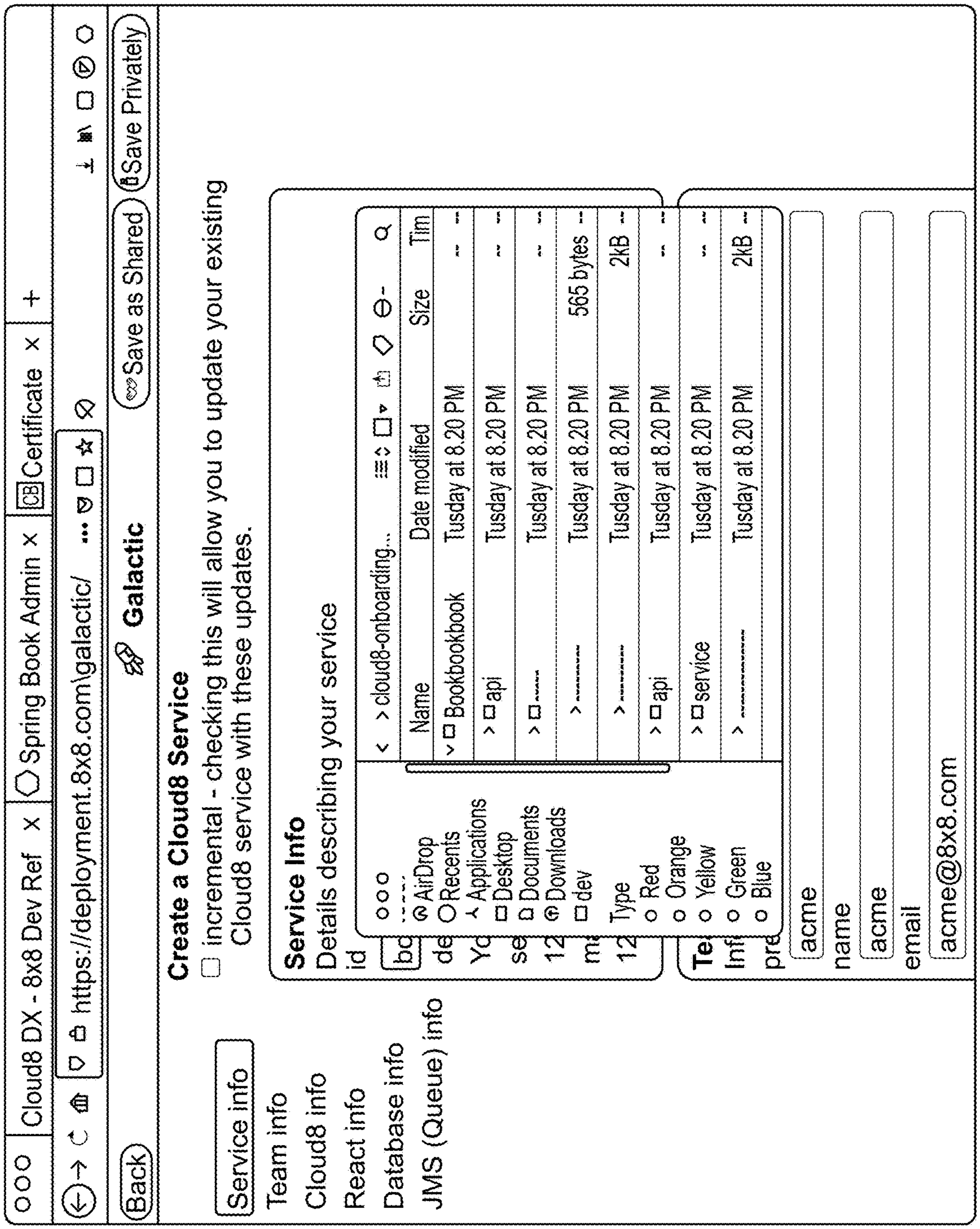

In connection with blocks 158 and 160 of FIG. 1C and as exemplified at FIGS. 2D and 2E, authorized personnel may also create and/or convey a database of relevant information to include with the templatized data (and/or scripted code) and which may be used with a specified data-communications services (available from the system 112). FIG. 2D is a screen shot of a template showing entry fields corresponding to data that may be used to create a database relating to one or more of the services depicted in FIG. 2A, and FIG. 2E is a screen shot of a display showing how an archived file format (e.g., a zip-file) may be automatically created, such as by the dataset-deployment system and FIG. 1B, for compressing the templatized sets of data provided by way of the authorized operator engaging with the UI in connection with FIGS. 2A through 2D. Proprietary developer framework tools, such as Cloud8™ (FIG. 2D) and Galactic™ (FIG. 2E) of 8×8, Inc., may be used to facilitate implementation of these options. From block 160 of FIG. 1C, flow proceeds to block 162 where the provided information is converted into a common deployment format and typically compressed (e.g., via a ZIP file) for uploading at locations designated for, in this particular example, the client entity for which the authorized personnel is provided information. As indicated in the foregoing description, data files/artifacts that are automatically created for a developer are further configured to include data types that foster automatic loading within a development environment, for example, when such files/artifacts automatically code for a developer when loaded into a development environment. This further improves processing efficiency with service creation and integration when working with files within a development environment.

Accordingly, by way of user-entries provided mostly along the left of the flow diagram of FIG. 1C, from the perspective of the authorized personnel (e.g., blocks 154, 158 and 164), code in the second type of datasets may be provided to the system 110 and integrated with the first type of datasets into the CD format. As characterized previously and exemplified above in connection with FIG. 1C discussion above, the CD format refers to the format of containerized code which, when it is to be deployed, the containerized code includes data of the first dataset type and data of the second data type that, together, are used to provide application services. As indicated in connection with the example depicted in FIG. 1B, such services are data-communications services to be implemented at customer-specified locations as specified by the customized customer-deployment information as provided by the templatized data and/or scripted code. Such designated locations are depicted at block 164 of FIG. 1C.

In the example depicted (and while not necessarily limited to this particular order), once the containerized code is in the CD format, as depicted at block 166, the authentication credentials for issuing the merged first and second types of datasets may be received. At block 168, the UI of the system 110 validates the authentication credentials. For added security, not one but two or more sets of authentication credentials may be required with each set providing login registrations of two authorized users (e.g., as identified in the customer's user profile). This authentication occurs before deploying the datasets (as merged or converted into the CD format), as may be important for such applications to be accessed and used by endpoints. For example, an initial set of authentication credentials may be provided by a lowerranking person acting on behalf of the client entity which provides the datasets of the second type and another set of authentication credentials may be provided by a higher-ranking (or supervisory) person acting on behalf of the client entity.

In FIG. 1C, the activities after block 168 depend on whether the authentication credentials pass muster. If so, deployment of the containerized code occurs at block 170, and the deployed applications may then be accessed, managed and their statuses tracked as indicated at blocks 172 and 174. Further, access to such deployed-application information is secured, as at block 182 according to access provisions such as provided in the client entity's customer profile, and this access may be public facing (e.g., for access over the Internet) as at block 181 or, as at block 182, private facing wherein only the client entity and/or service provider may have access. Examples of how these activities might be viewed are shown in connection with FIG. 3A et seq.

If the authentication credentials do not pass muster, flow proceeds from block 168 to block 178 of FIG. 1C, where the UI sends one or more notifications to personnel such as those designated in the user profile of the customizing client entity. As is conventional, other precautionary security measures may also be taken and which are consistent with these approaches.

FIGS. 3A-3I are screen shots illustrating one of various sets of exemplary forms, which when operational via a user interface (UI) and related data-processing logic circuitry, may be used to prompt an authorized operator to deploy, track and/or manage a data-communications service (such as one based on the exemplary set of activities and/or data flow discussed in connection with the previous FIGS. 2A-2E). For example, a proprietary developer deployment tool (Global Deployment System™) of 8×8, Inc., is created and applied having a GUI adapted to provide functionality that automates management of deployment of services within one or more software platforms. Such an exemplary developer deployment tool greatly improves management of deployment of services so that a developer can easily associate a service (e.g., one build automatically using an exemplary developer framework tool previously described) with other clustered services (e.g., Kubernetes clusters). An exemplary developer deployment tool is configured to do so without a developer needing to understand how specific developer tools work (e.g., Kubernetes, Helm, Docker, Jenkins) or needing to download standalone files for such developer tools, thereby greatly improving development of apps/services and integration of the same into one or more software platforms.

An exemplary developer deployment tool (e.g., Global Deployment System™) is uniquely adapted to automatically push apps/services into deployment and further manage deployment states of apps/services in a centralized and organized manner. For example, an exemplary developer deployment tool is configured to automatically manage all data and metadata related to a cluster as well as update cluster data for any related applications/services when a change to cluster data for a specific application/service is made. That is, when cluster data related to an app/service is updated, cluster data for other applications/services is automatically updated through the developer deployment tool so that developers do not have to go back and manually update cluster data for all associated applications/services. An exemplary developer deployment tool further provides auditability and traceability for deployment states related to apps/services that can help to avoid common deployment pitfalls (e.g., causing outages; and deployment without proper approval) as well as enabling rollback of versions of apps/services to quickly troubleshoot deployment issues. FIGS. 3A-3I provide exemplary non-limiting screen shots capturing functionality of an exemplary developer deployment tool.

Figure 3A:
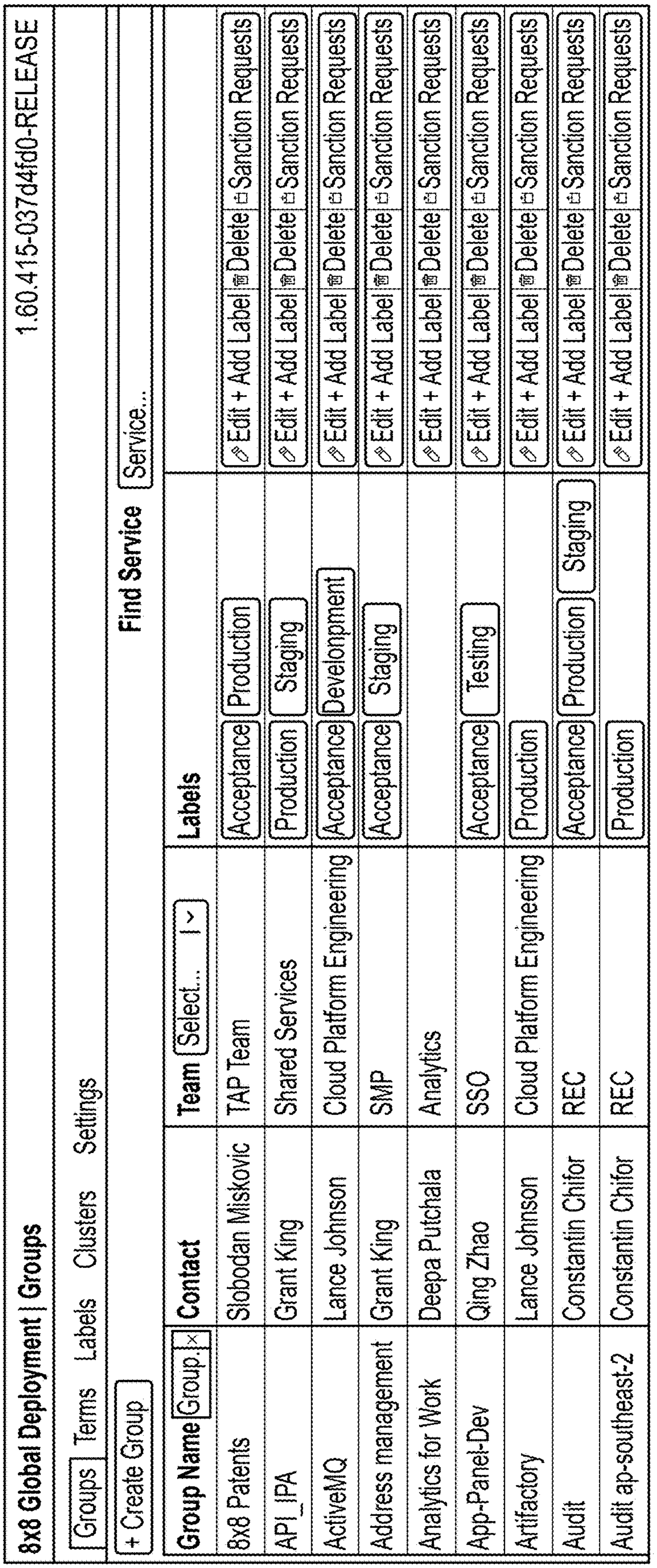
FIGS. 3A, 3B, 3C, 3D, 3E, 3F, 3G, 3H and 3I are screen shots, with similar illustrations of aesthetic aspects as in FIGS. 2A-2E, illustrating one of various sets of exemplary forms, which when operational via a user interface (UI) and related data-processing logic circuitry, may be used to prompt an authorized operator to deploy, track and/or manage a data-communications service (such as one based on the exemplary set of activities and/or data flow discussed in connection with the previous FIGS. 2A-2E.

FIG. 3A is a screen shot of a template showing entry fields for data that may be entered for initializing information before deployment of the information in the CD format. For example, an adapted user interface of an exemplary developer deployment tool provides GUI functionality that enables developers to easily manage deployment states for applications/services as well as manage data and metadata pertaining to a cluster relating to a deployed application/service. As shown in FIG. 3A, data pertaining to an application/service (e.g., data entered through an exemplary developer framework tool) is auto-populated for a developer within an adapted GUI, including but not limited to: name/identifier of an application/service; developer contact; development team; and labeling for a deployment state of an application/service, among other examples. Additionally, an adapted GUI is enabled to provide functionality for control over a deployment state of an application/service (cluster data thereof), including but not limited to functionality such as: editing of a deployment state (labeling thereof); adding/deleting labels for a deployment state; and management of states of sanctions/requests (e.g., approvals and/or requirements for changes to a deployment state of an application/service), among other examples.

Figure 3B:
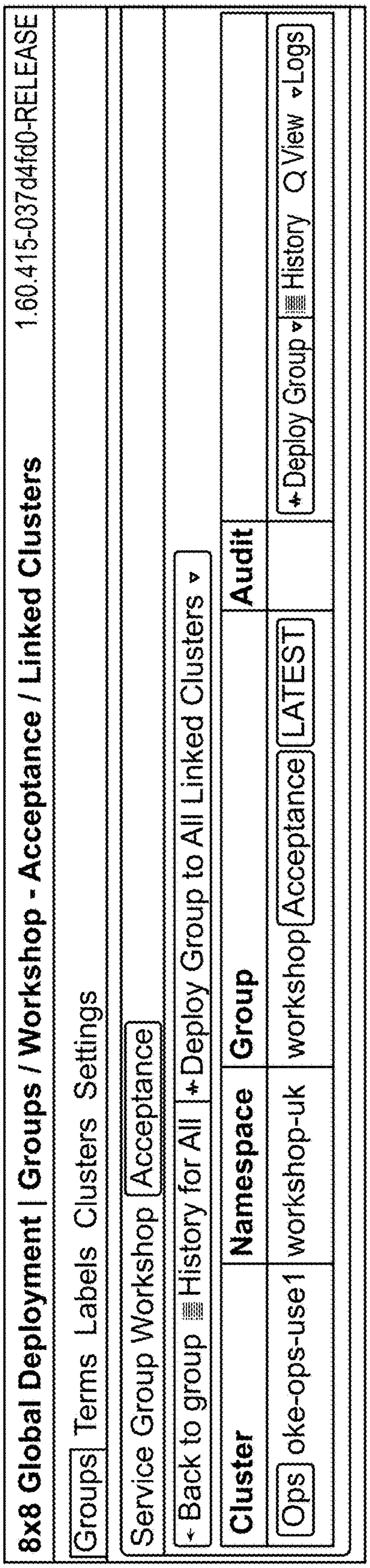

FIG. 3B is a screen shot of a template showing fields for data that may be entered for managing individual clusters. As an example, when a specific application/service is selected from the GUI menu shown in FIG. 3A, the GUI menu shown in FIG. 3B may be automatically presented to a user through the GUI of the exemplary developer deployment tool. This enables developers to drill into specific data and metadata pertaining to an exemplary cluster. For example, developers, through an adapted GUI, have automated control over groupings of clusters (including management of groupings); deployment state information for a cluster; deployment history data for a cluster; and log data pertaining to deployment of a cluster, among other examples.

Figure 3C:
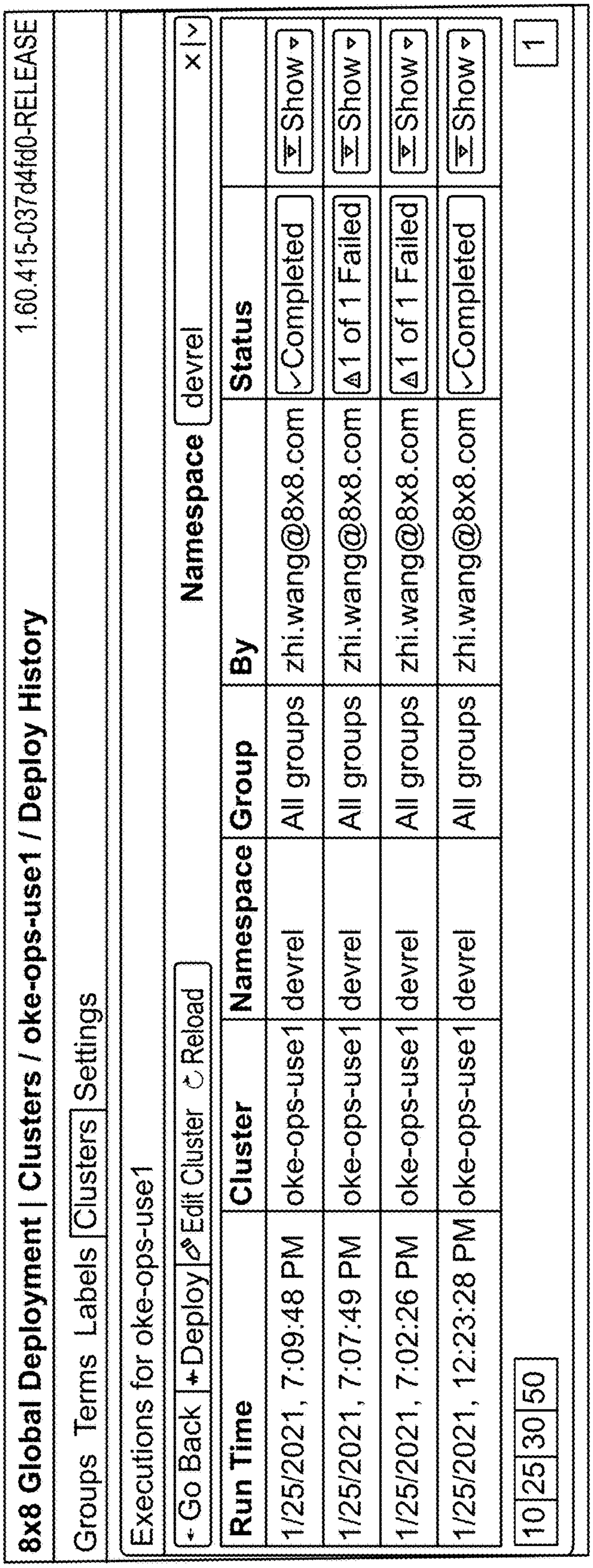

FIG. 3C is a screen shot showing fields or sections of the screen for data that may be displayed to facilitate understanding (or tracking) of a history of a service cluster. As an example, the GUI menu shown in FIG. 3C, may be automatically presented to a user through the GUI of the exemplary developer deployment tool when a GUI feature is selected from that shown in FIG. 3B (e.g., "history" GUI feature). This enables a developer to obtain quick access into a history of deployment of a cluster and to efficiently troubleshoot deployment issues and/or understand states of a cluster. For example, an adapted GUI provides GUI functionality that is programmed to visually identify deployment states of past deployments, thereby tracking a history of deployment for a cluster. In one example, as shown in FIG. 3C, deployment states may be color-coded to enable developers to quickly identify whether a past deployment was successful or had errors and/or failed. This further helps developers identify whether a rollback to a previous deployment version is feasible and/or identify a preferred option to resolve a deployment issue.

Figure 3D:
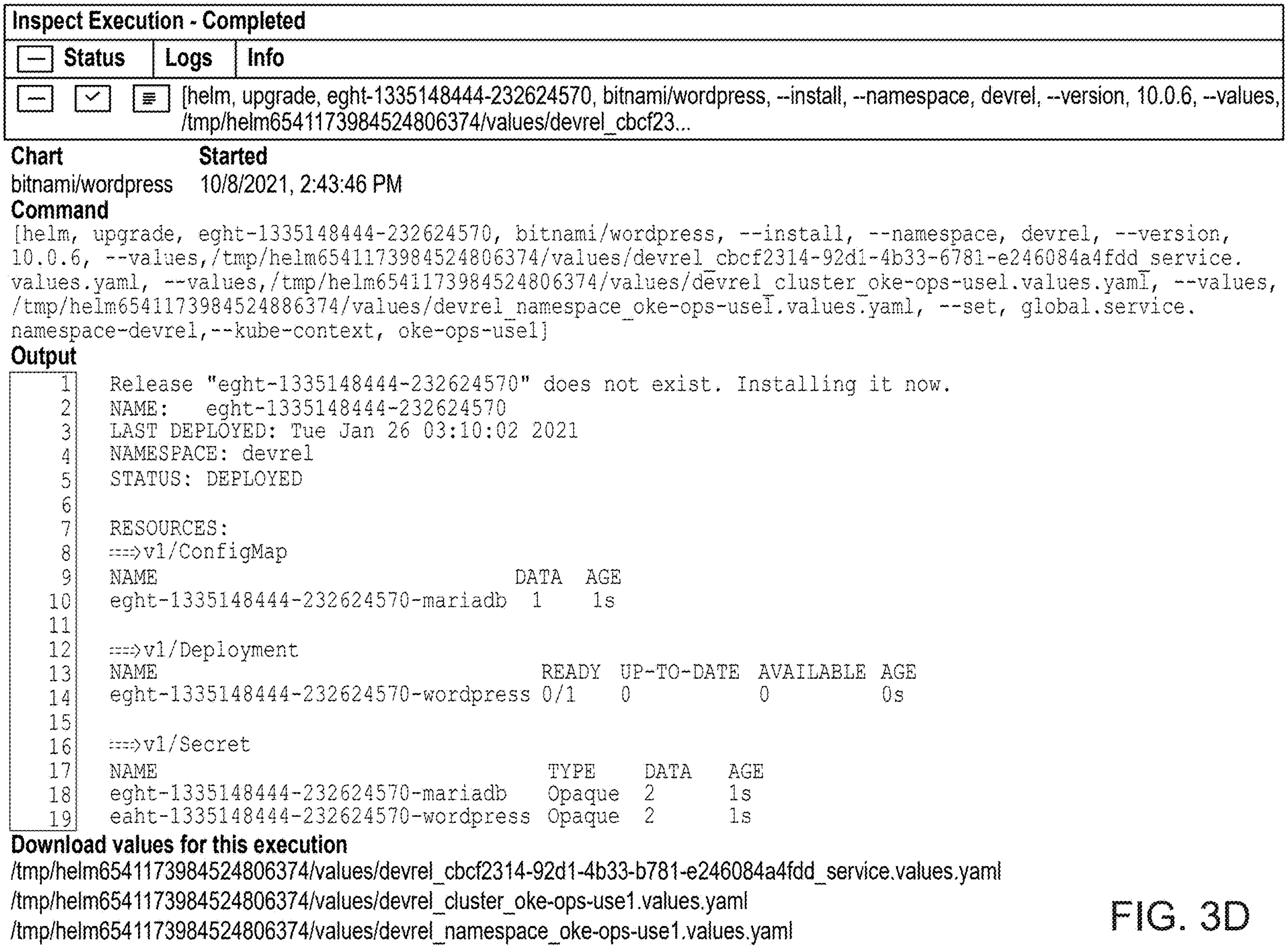

FIG. 3D is a screen shot showing fields or sections of the screen for data that may be displayed to facilitate understanding as to what has happened to a cluster. As an example, the GUI menu shown in FIG. 3D, may be automatically presented to a user through the GUI of the exemplary developer deployment tool when a GUI feature is selected from that shown in FIG. 3C (e.g., "show" GUI feature). This enables inspection of execution of a deployed cluster at a coding level. Importantly, this is automatically presented for a developer through the GUI, where developers would not need to run specific developer tools (e.g., Kubernetes or Helm) or have permissions necessary to gain access to this important information.

Figure 3E:
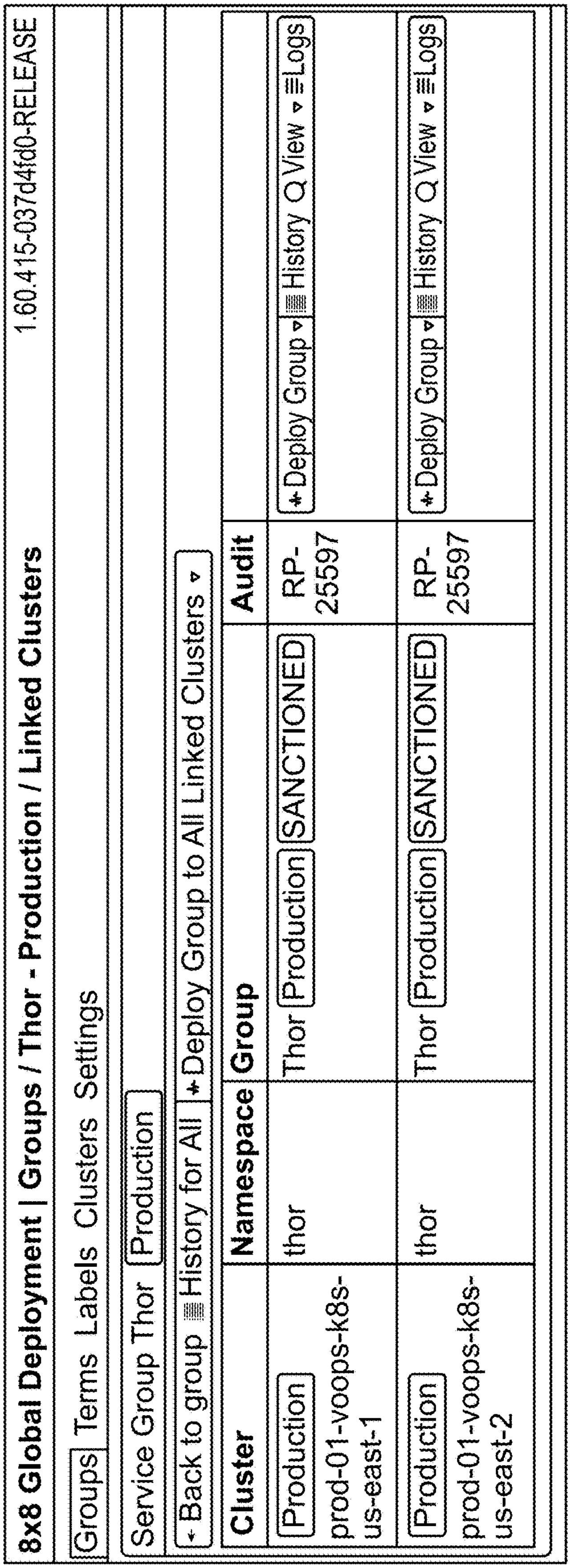

FIG. 3E is a screen shot showing fields or sections of the screen related to authorization requirements for deployment of a service cluster. As shown in FIG. 3E, a GUI of an exemplary developer deployment tool is adapted to visualize for a user (e.g., developer) states of linked clusters (e.g., linked to a cluster for a specific application/service). Additionally, control over deployment of clusters (including linked clusters) for production purposes is managed through an exemplary GUI. For example, developers can create/identify/manage states of sanctions/requests including approvals needed to push a cluster to production, rollback a cluster, etc. This provides auditability and traceability within an organization for specific instances of deployment.

Figure 3F:
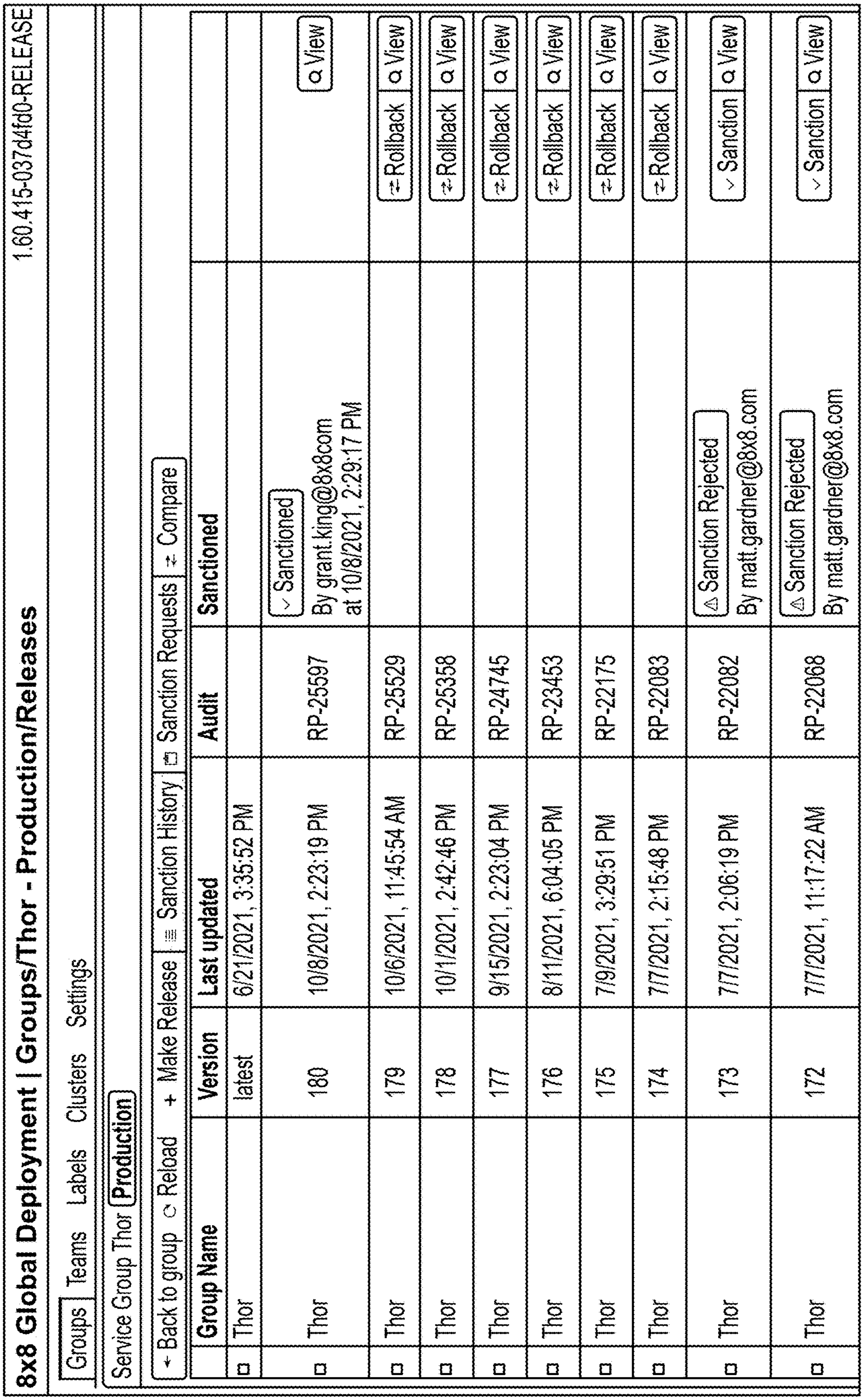

FIG. 3F is a screen shot showing fields or sections of the screen for facilitating management over one or more deployed clusters. As shown in FIG. 3F, a GUI of an exemplary developer deployment tool is adapted to visualize for a user (e.g., developer) GUI elements to enable users to manage deployment states for clusters. For example, users (e.g., developers) have access to audit states for clusters (including corresponding audit tickets), ability to rollback to previous deployed versions, control releases, refresh listings (e.g., as updates to clusters are made in real-time), and view applicable sanctions/requests, and compare clusters (including versions thereof), among other examples.

Figure 3G:
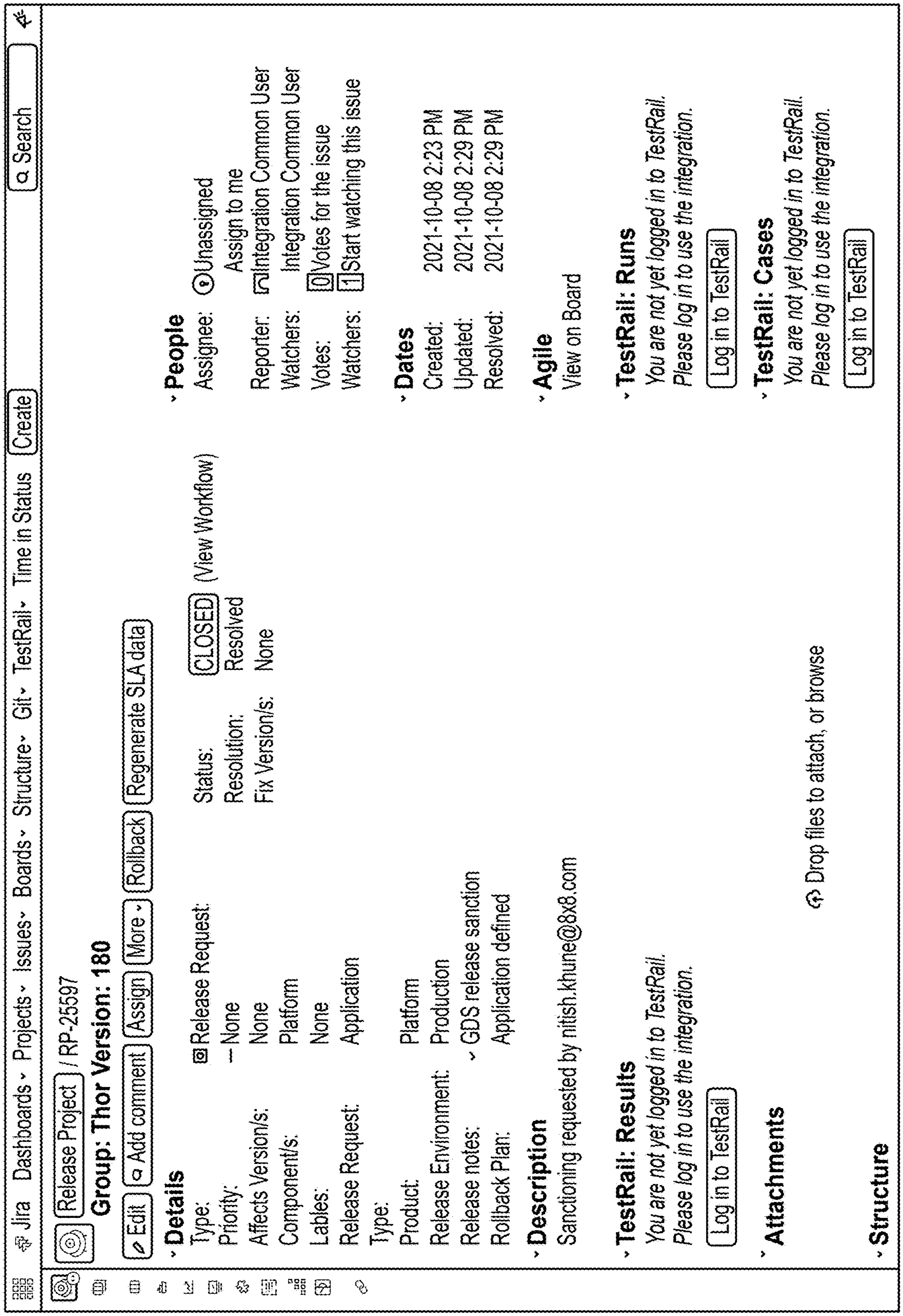

FIG. 3G is a screen shot showing fields or sections of the screen for showing an auditable linked ticket corresponding to one or more deployed clusters which may have been authorized for deployment of a service cluster. As shown in FIG. 3G, a GUI of an exemplary developer deployment tool is adapted to visualize for a user (e.g., developer) GUI elements to enable users to view audit records pertaining to a cluster. An exemplary developer deployment tool may be adapted to automatically integrate audit records for clusters (e.g., auditable linked tickets) into a GUI, where users can access audit records in real-time (or near real-time). Traditionally, access to audit records was a manual process, where efficiency is greatly improved by automating and displaying in real time this functionality (and access to audit records) through an exemplary developer deployment tool.

Figure 3H:
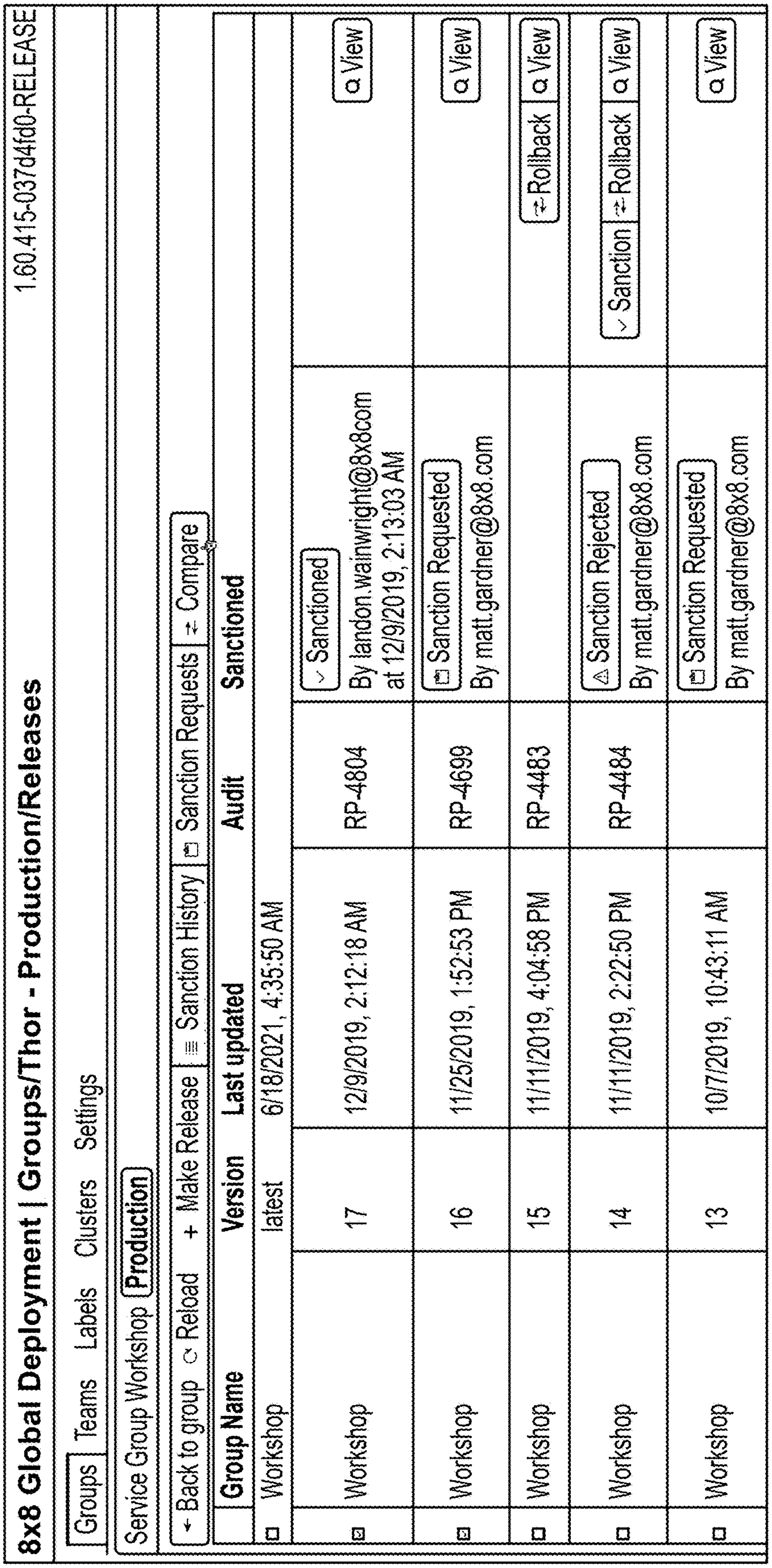

FIG. 3H is a screen shot showing how different versions of related clusters may be compared and with changes therebetween highlighted. As shown in FIG. 3H, a GUI of an exemplary developer deployment tool is adapted to visualize for a user (e.g., developer) GUI elements to enable users to compare data between clusters. For example, a GUI of a developer deployment tool is adapted to enable selection of any available clusters to compare pertinent cluster data including version data pertaining to specific clusters.

Figure 3I:
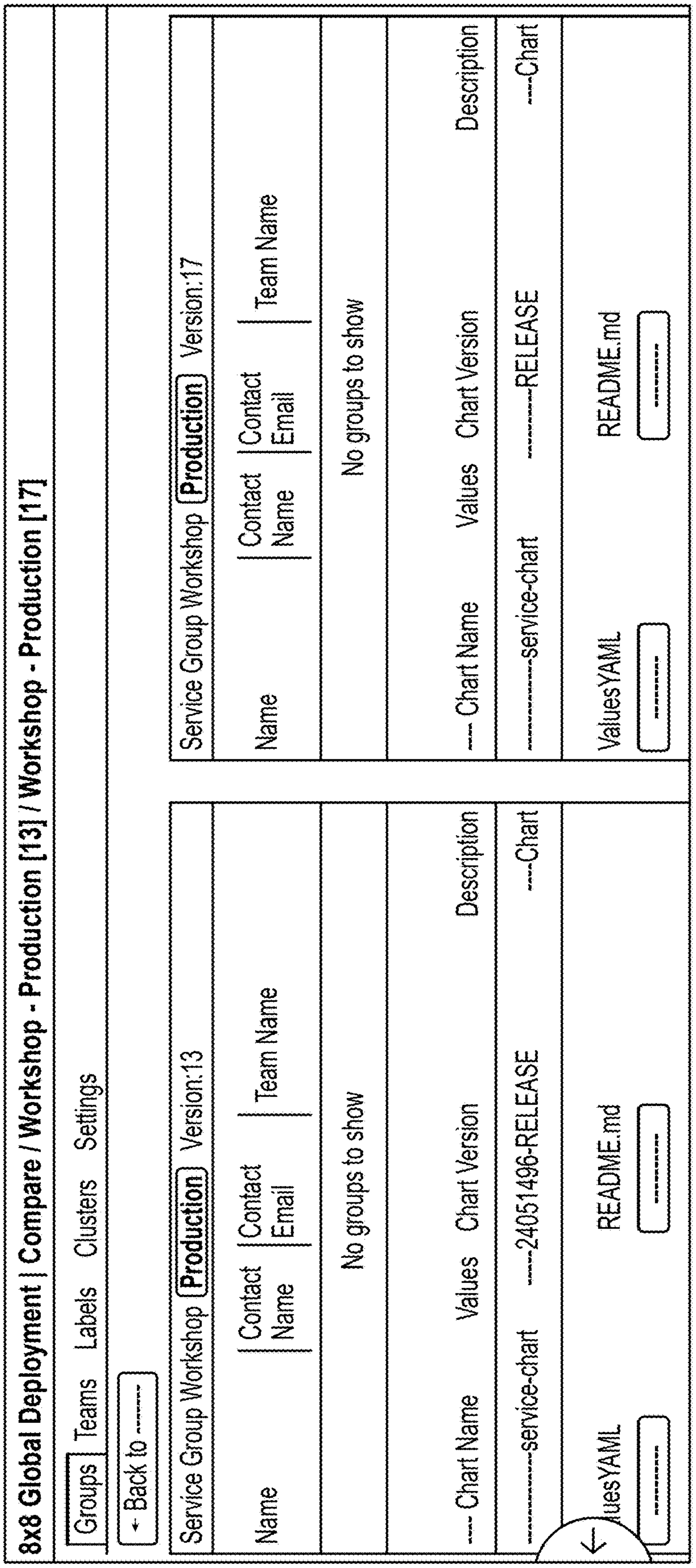

FIG. 3I is a screen shot showing how two different versions of related clusters may be compared using a fields oriented in a side-by-side manner. As an example, when a specific application/service is selected from the GUI menu shown in FIG. 3H, the GUI menu shown in FIG. 3I may be automatically presented to a user through the GUI of the exemplary developer deployment tool. This enables users to select specific clusters and compare pertinent version data for selected clusters in an easy and efficient manner.

One or more of the above specific examples may also involve the following: the communications circuit and the CPU may be communicatively integrated via a private communications link; the first type of dataset may correspond to software for providing data communications services; the user interface may be configured for operation on behalf of a software developer to send the first type of dataset, including templatized scripted commands, to the central processing and deployment circuit; the first type of dataset may correspond to software configured for providing data communications services; and/or the deployment status data may indicate identification and authorization information for applications authorized to be running and, if provided to the central processing and deployment circuit, indicate current and past container images.

In connection with certain other aspects, the present disclosure is directed to overcoming the complexities associated with having to work with, or have expertise in, different types of protocol-specific tools for deploying software (e.g., Docker, Helm, and Kubernetes) that developers may utilize, to understand and to manage localized versions thereof on their CPU-based machines. Such aspects of the present disclosure overcomes these issues by providing a type of developer framework that does not require developers: to download and maintain local versions of such protocol-specific tools for deploying software on developer machines, to know how to code in those specific development tools; to know all the service(s) clusters already existing within an organization that which a new service and/or cluster would want to connect with; and/or to manually manage deployment of service clusters. Various aspects of the present disclosure address these issues by providing for automatic integration of a service/cluster with already existing services/clusters, providing ease of integration and scalability when new services and/or clusters are added, and providing automatic management of the deployment of service clusters. As one of many advantageous aspects in these contexts, if a service cluster of a certain client entity goes down, there can be issues with respect to at least latency and availability of services. Aspects of the present disclosure can address these issues, for example, by being automatically notified that a container is down and by quickly deploying another container, thereby reducing latency and maintaining high availability of services.

Also and among other advantages, aspects of the present disclosure are directed to improvements for development processing and efficiency (both from a developer user perspective as well as a device perspective). These aspects may include, as examples, reductions in processing cycles for development operations integrations, reductions in bandwidth and reductions in required resources. Related advantages of certain aspects include mitigating or removing traditional requirements involving: localized copies of a different development-operations software to be locally maintained on devices; complex coding to create service and/or integrate service with other existing services of an organization; and using manual tracking and auditing to maintain high availability of deployed services. Such advantages can be significant especially when, as applicable for the type of system disclosed herein, the system is deploying hundreds of services (e.g., around the globe and being related to data communications).

As examples, the Specification describes and/or illustrates aspects useful for implementing the claimed disclosure by way of various circuits or circuitry which may be illustrated as or using terms such as blocks, modules, device, system, unit, controller, and/or other circuit-type depictions (e.g., as in reference numerals used in FIGS. 1A, 1B and 1C depict blocks and/or module as described herein). Such circuits or circuitry are used together with other elements to exemplify how certain embodiments may be carried out in the form or structures, steps, functions, operations, activities, etc. For example, such circuits or circuitry may correspond to logic circuitry (which may refer to or include a code-programmed/configured CPU), wherein the logic circuitry may carry out a process or method (sometimes "algorithm") by performing a first-named activity and also a second-named activity.

In certain embodiments, such a programmable circuit is one or more computer circuits, including memory circuitry for storing and accessing a program to be executed as a set (or sets) of instructions and/or to be used as configuration data to define how the programmable circuit is to perform, and an algorithm or process (e.g., as described in connection with certain discussion of steps in FIG. 1C) may be used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit). As another example, where the Specification may make reference to a "first [type of structure]", a "second [type of structure]", etc., where the [type of structure] might be replaced with terms such as ["circuit", "circuitry" and others], the adjectives "first" and "second" are not used to connote any description of the structure or to provide any substantive meaning; rather, such adjectives are merely used for English-language antecedence to differentiate one such similarly-named structure from another similarly-named structure (e.g., "first circuit configured to convert . . . " is interpreted as "circuit configured to convert . . . ").

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. Such modifications do not depart from the true spirit and scope of various aspects of the disclosure, including aspects set forth in the claims.

What is claimed is:

1. An apparatus comprising:

a communications circuit including logic circuitry configured to receive a first type of dataset, including templatized or scripted commands, and a second type of dataset corresponding to one or more containerized applications, over a broadband network, and to validate sets of authentication credentials respectively for the first and second types of datasets; and a central processing and deployment circuit, including one or more CPU servers, configured to:

convert the first type of dataset to a common deployment (CD) format, convert the second type of dataset to the CD format, the first type of dataset being in a format that is different from a format of the second type of dataset, the second type of dataset comprising the one or more containerized applications or data in the one or more containerized applications, merge the converted first type of dataset with the converted second type of dataset to obtain a merged dataset, and deploy, the merged data set in the CD format for access and use by endpoint devices in one or more regions.

2. The apparatus of claim 1, wherein the apparatus is a system in which the central processing and deployment circuit is part of a communications-services document deployment platform having the one or more CPU servers communicatively-integrated to receive instruction documents from at least one origination entity, wherein the communications-services document deployment platform is to distribute software for servers of a data communications system platform, including a plurality of Cloud-based servers, to provide communications services.

3. The apparatus of claim 1, wherein the apparatus is a system in which the central processing and deployment circuit is part of a communications-services document deployment platform having the one or more CPU servers communicatively-integrated to receive instruction documents from at least one origination entity, wherein the instruction documents include the templatized or scripted commands and are deployed to provide updates of communications services.

4. The apparatus of claim 1, wherein the templatized or scripted commands are in a format that is used to select a type of service to be provided by or in conjunction with the second type of dataset.

5. The apparatus of claim 1, wherein the second type of dataset includes one or more clusters of software application, and each of the one or more clusters includes a set of one or more computing processor nodes to run the one or more containerized applications and further includes a control plane that, for each of the clusters, is to maintain a plurality of states of the cluster by providing tracking data to indicate which applications are running and indicating any container images being used.

6. The apparatus of claim 5, wherein the one or more clusters of software application of the second type of dataset is organized or formatted via a protocol-specific tool, and wherein the central processing and deployment circuit further includes a second interface to receive, over the broadband network, the respective sets of authentication credentials for issuing the first and second types of datasets.

7. The apparatus of claim 1, wherein the central processing and deployment circuit is to deploy said at least one of the first type of dataset and the second type of dataset for access and use by endpoints in response to the respective sets of authentication credentials and further in response to a deployment request that the central processing and deployment circuit recognizes as being sanctioned by supervisory individual.

8. The apparatus of claim 1, wherein the first type of dataset is to indicate whether software in the one or more containerized applications associated with the second type of dataset is to be accessible to one or more groups, said one or more groups including at least one from among: at least one public facing group, at least one private or internal group designated to use the software on behalf of a certain client entity, and a group specific to a system.

9. The apparatus of claim 1, further comprising a user interface configured for operation on behalf of a software developer to send the first type of dataset, including templatized or scripted commands, to the central processing and deployment circuit.

10. The apparatus of claim 1, wherein the first type of dataset corresponds to data to select one or more software applications for providing data communications services.

11. The apparatus of claim 1, wherein the central processing and deployment circuit is further to manage and track current and past deployments, according to each of said at least one of the first type of dataset and the second type of dataset, by maintaining deployment status data and by providing one or more authorized entities access to the deployment status data.

12. The apparatus of claim 1, wherein the central processing and deployment circuit is configured to maintain deployment status data indicating identification and authorization information for applications authorized to be running and, if provided to the central processing and deployment circuit, indicating current and past container images.

13. The apparatus of claim 1, wherein the templatized or scripted commands in the first type of dataset are client-specific, and wherein the converted first type of dataset comprises client-specific information in the CD format.

14. The apparatus of claim 1, further comprising a user interface configured to allow a user to enter the templatized or scripted commands, the templatized or scripted commands identifying (1) a service to be provided and (2) criterion for providing the service, and wherein the converted first type of dataset comprises information regarding the identified service and the identified criterion in the CD format.

15. The apparatus of claim 1, further comprising a user interface configured to provide a document identifying a list of available services for a user to select, wherein the templatized or scripted commands include information regarding a selected one of the available services, and wherein the converted first type of dataset comprises the information in the CD format.

16. The apparatus of claim 1, wherein the format of the first type of dataset is independent of the format of the second type of dataset.

17. A processor-readable non-transitory medium storing a set of instructions, wherein an execution of the instructions will cause a method to be performed, the method comprising:

via a communications circuit with logic circuitry, receiving a first type of dataset, including templatized or scripted commands, and a second type of dataset corresponding to one or more containerized applications, over a broadband network, and validating sets of authentication credentials respectively for the first and second types of datasets;

converting the first type of dataset to a common deployment (CD) format;

converting the second type of dataset to the CD format, the first type of dataset being in a format that is different from a format of the second type of dataset, the second type of dataset comprising the one or more containerized applications or data in the one or more containerized applications;

merging the converted first type of dataset with the converted second type of dataset to obtain a merged dataset; and deploying, the merged dataset in the CD format for access and use by endpoint devices in one or more regions.

18. A method comprising:

via a communications circuit with logic circuitry, receiving a first type of dataset, including templatized or scripted commands, and a second type of dataset specific to and corresponding to one or more containerized applications, over a broadband network, and validating sets of authentication credentials respectively for the first and second types of datasets; and via a central processing and deployment circuit, including one or more CPU servers, converting the first type of dataset to a common deployment (CD) format, converting the second type of dataset to the CD format, the first type of dataset being in a format that is different from a format of the second type of dataset, the second type of dataset comprising the one or more containerized applications or data in the one or more containerized applications, merging the converted first type of dataset with the converted second type of dataset to obtain a merged dataset, and deploying, the merged dataset in the CD format for access and use by endpoint devices in one or more regions.

19. The method of claim 18, wherein the format of the first type of dataset is independent of the format of the second type of dataset.

20. The processor-readable non-transitory medium of claim 17, wherein the format of the first type of dataset is independent of the format of the second type of dataset.

* * * * *